US012626966B2

(12) United States Patent
Rathod et al.

(10) Patent No.: US 12,626,966 B2
(45) Date of Patent: May 12, 2026

(54) BATTERY CELL THERMAL RUNAWAY BARRIER

(71) Applicant: 3M INNOVATIVE PROPERTIES COMPANY, St. Paul, MN (US)

(72) Inventors: Shailendra B. Rathod, St. Paul, MN (US); Patrick Welter, Bisingen (DE); Gary F. Howorth, Oakdale, MN (US); Claus Middendorf, Neuss (DE); Kerstin C. Rosen, Cologne (DE); Tien Wu, Woodbury, MN (US); Heonjoo Ha, Woodbury, MN (US); Martin Schaschke, Menden (DE)

(73) Assignee: 3M Innovative Properties Company, St. Paul, MN (US)

( * ) Notice: Subject to any disclaimer, the term of this patent is extended or adjusted under 35 U.S.C. 154(b) by 756 days.

(21) Appl. No.: 18/007,194

(22) PCT Filed: Jul. 30, 2021

(86) PCT No.: PCT/IB2021/056993
§ 371 (c)(1),
(2) Date: Jan. 27, 2023

(87) PCT Pub. No.: WO2022/024076
PCT Pub. Date: Feb. 3, 2022

(65) Prior Publication Data
US 2023/0238600 A1      Jul. 27, 2023

Related U.S. Application Data

(60) Provisional application No. 63/058,863, filed on Jul. 30, 2020.

(51) Int. Cl.
*H01M 10/613* (2014.01)
*B32B 3/04* (2006.01)
(Continued)

(52) U.S. Cl.
CPC ............. *H01M 10/613* (2015.04); *B32B 3/04* (2013.01); *B32B 5/022* (2013.01); *B32B 7/12* (2013.01);
(Continued)

(58) Field of Classification Search
CPC ............. H01M 10/613; H01M 10/625; H01M 10/651; H01M 10/6557; H01M 10/658;
(Continued)

(56) References Cited

U.S. PATENT DOCUMENTS 4,600,634 A      7/1986  Langer
5,384,188 A      1/1995  Lebold et al.
(Continued)

FOREIGN PATENT DOCUMENTS

CN          101960646 A  *  1/2011  ............ H01M 50/44
CN          103249560 A  *  8/2013  ............ C08J 7/0423
(Continued)

OTHER PUBLICATIONS

Concrete product information from ArchiExpo (date unknown but believed to be prior to the date of the filing of the present application), retrieved from the internet on Mar. 7, 2023, URL <website: https://www.archiexpo.com/architecture-designmanufacturer/expanded-clay-aggregate-concrete-23000.html>, 5 Pages.
(Continued)

*Primary Examiner* — Kaity V Chandler
(74) *Attorney, Agent, or Firm* — Carlos M. Téllez Rodríguez; 3M Innovative Properties Co

(57) ABSTRACT

A thermal runaway barrier for at least significantly slowing down a thermal runaway event within a battery assembly. The thermal runaway barrier consisting essentially of a single-layer of a nonwoven fibrous thermal insulation comprising a fiber matrix of inorganic fibers, thermally insulative inorganic particles dispersed within the fiber matrix, and
(Continued)

a binder dispersed within the fiber matrix so as to hold together the fiber matrix. An optional organic encapsulation layer may also be used to encapsulate the nonwoven fibrous thermal insulation.

14 Claims, 4 Drawing Sheets

(51) Int. Cl.

| | |
|---|---|
| B32B 5/02 | (2006.01) |
| B32B 7/12 | (2006.01) |
| B32B 27/12 | (2006.01) |
| B32B 27/36 | (2006.01) |
| D04H 1/413 | (2012.01) |
| D04H 1/4209 | (2012.01) |
| D04H 1/64 | (2012.01) |
| D04H 1/732 | (2012.01) |
| H01M 10/625 | (2014.01) |
| H01M 10/651 | (2014.01) |
| H01M 10/6557 | (2014.01) |
| H01M 10/658 | (2014.01) |
| H01M 50/204 | (2021.01) |
| H01M 50/30 | (2021.01) |
| H01M 50/342 | (2021.01) |

(52) U.S. Cl.
CPC ............. *B32B 27/12* (2013.01); *B32B 27/36* (2013.01); *D04H 1/413* (2013.01); *D04H 1/4209* (2013.01); *D04H 1/64* (2013.01); *D04H 1/732* (2013.01); *H01M 10/625* (2015.04); *H01M 10/651* (2015.04); *H01M 10/6557* (2015.04); *H01M 10/658* (2015.04); *H01M 50/204* (2021.01); *H01M 50/30* (2021.01); *H01M 50/342* (2021.01); *B32B 2250/40* (2013.01); *B32B 2255/10* (2013.01); *B32B 2255/26* (2013.01); *B32B 2255/28* (2013.01); *B32B 2262/108* (2013.01); *B32B 2264/10* (2013.01); *B32B 2264/1021* (2020.08); *B32B 2307/304* (2013.01); *B32B 2307/306* (2013.01); *B32B 2457/10* (2013.01); *D10B 2401/04* (2013.01); *D10B 2505/00* (2013.01); *H01M 2220/20* (2013.01)

(58) Field of Classification Search
CPC .. H01M 50/204; H01M 50/30; H01M 50/342; H01M 2220/20; H01M 10/6551; H01M 10/6555; H01M 50/244; H01M 50/293; B32B 3/04; B32B 5/022; B32B 7/12; B32B 27/12; B32B 27/36; B32B 2250/40; B32B 2255/10; B32B 2255/26; B32B 2255/28; B32B 2262/108; B32B 2264/10; B32B 2264/1021; B32B 2307/304; B32B 2307/306; B32B 2457/10; D04H 1/413; D04H 1/4209; D04H 1/64; D04H 1/732; D04H 1/58; D10B 2401/04; D10B 2505/00; Y02E 60/10
See application file for complete search history.

(56) References Cited

U.S. PATENT DOCUMENTS

| | | | | |
|---|---|---|---|---|
| 5,834,120 A | | 11/1998 | Murray et al. | |
| 5,869,010 A | | 2/1999 | Langer | |
| 5,869,407 A | * | 2/1999 | Rusek, Jr. ............... | B32B 15/14 |
| | | | | 442/140 |
| 6,008,147 A | * | 12/1999 | Jaffee ...................... | B32B 5/022 |
| | | | | 156/212 |
| 6,043,169 A | * | 3/2000 | Jaffee ...................... | B29C 70/12 |
| | | | | 442/379 |
| 6,068,882 A | | 5/2000 | Ryu | |
| 6,458,418 B2 | | 10/2002 | Langer et al. | |
| 6,808,664 B2 | | 10/2004 | Falk et al. | |
| 7,413,797 B2 | | 8/2008 | De Souza | |
| 7,491,354 B2 | | 2/2009 | Anderson | |
| 7,635,411 B2 | | 12/2009 | Rouanet et al. | |
| 8,480,916 B2 | | 7/2013 | Fernando et al. | |
| 8,541,126 B2 | | 9/2013 | Hermann et al. | |
| 8,663,774 B2 | | 3/2014 | Fernando et al. | |
| 8,709,645 B2 | | 4/2014 | Roy | |
| 8,729,155 B2 | | 5/2014 | Wierzbicki et al. | |
| 8,834,759 B2 | | 9/2014 | Lalouch et al. | |
| 8,993,145 B2 | | 3/2015 | Muniz | |
| 9,321,243 B2 | | 4/2016 | Fernando et al. | |
| 9,399,864 B2 | | 7/2016 | Samanta et al. | |
| 9,475,034 B2 | | 10/2016 | Vincent et al. | |
| 9,580,848 B2 | | 2/2017 | Henderson et al. | |
| 10,234,069 B2 | | 3/2019 | Kulprathipanja et al. | |
| 2007/0014979 A1 | * | 1/2007 | Bullock ................... | D04H 1/46 |
| | | | | 428/292.1 |
| 2007/0173157 A1 | | 7/2007 | Trifu et al. | |
| 2008/0057334 A1 | | 3/2008 | Schroth | |
| 2010/0075221 A1 | | 3/2010 | Mehta et al. | |
| 2010/0115900 A1 | | 5/2010 | De Rovere et al. | |
| 2011/0126957 A1 | | 6/2011 | Wierzbicki et al. | |
| 2012/0034501 A1 | | 2/2012 | Hermann | |
| 2013/0153317 A1 | | 6/2013 | Rawlinson et al. | |
| 2014/0141676 A1 | | 5/2014 | Crandall et al. | |
| 2014/0287641 A1 | | 9/2014 | Steiner, III | |
| 2017/0073059 A1 | | 3/2017 | Fernando et al. | |
| 2017/0098806 A1 | | 4/2017 | Bowersock et al. | |
| 2017/0210093 A1 | * | 7/2017 | Rikleen ................... | B32B 5/024 |
| 2017/0214103 A1 | | 7/2017 | Onnerud et al. | |
| 2017/0245380 A1 | | 8/2017 | Yun et al. | |
| 2017/0335737 A1 | | 11/2017 | Kunze et al. | |
| 2018/0309095 A1 | | 10/2018 | Olchawski et al. | |
| 2020/0185794 A1 | * | 6/2020 | Jeong ................. | H01M 50/124 |
| 2020/0290933 A1 | | 9/2020 | Honda | |
| 2021/0167438 A1 | | 6/2021 | Evans et al. | |
| 2023/0238600 A1 | | 7/2023 | Rathod et al. | |
| 2023/0282905 A1 | | 9/2023 | Wu | |

FOREIGN PATENT DOCUMENTS

| | | | | |
|---|---|---|---|---|
| CN | 104029429 A | | 9/2014 | |
| CN | 207697181 U | * | 8/2018 | ............. Y02E 60/10 |
| CN | 109879636 A | | 6/2019 | |
| CN | 110260097 A | | 9/2019 | |
| CN | 110641101 A | | 1/2020 | |
| CN | 210136903 U | * | 3/2020 | ............. Y02E 60/10 |
| CN | 210136917 U | * | 3/2020 | ............. Y02E 60/10 |
| CN | 112552669 A | | 3/2021 | |
| EP | 3262287 B1 | | 1/2020 | |
| EP | 2560817 B1 | | 6/2020 | |
| WO | WO-03064025 A1 | * | 8/2003 | .......... B01J 13/0091 |
| WO | 2015179597 A1 | | 11/2015 | |
| WO | 2015179625 A1 | | 11/2015 | |
| WO | WO-2019038682 A1 | * | 2/2019 | ............. A61K 38/39 |
| WO | WO-2019088195 A1 | * | 5/2019 | .......... H01M 50/204 |
| WO | WO-2019107560 A1 | * | 6/2019 | .......... H01M 10/658 |
| WO | 2020100067 A1 | | 5/2020 | |
| WO | 2020188423 A1 | | 9/2020 | |
| WO | 2020261011 A1 | | 12/2020 | |
| WO | 2020261012 A1 | | 12/2020 | |
| WO | 2021019495 A1 | | 2/2021 | |
| WO | 2022024076 A1 | | 2/2022 | |
| WO | 2022024078 A1 | | 2/2022 | |

OTHER PUBLICATIONS

Expanded Clay Aggregate (date unknown but believed to be prior to the date of the filing of the present application), accessed from internet on Mar. 7, 2023, URL <www.sciencedirect.com/topics/engineering/expanded-clay-aggregate>, 25 Pages.

(56)                    References Cited

OTHER PUBLICATIONS

Extended Search Report for EP Application No. 24166024.0, mailed on May 29, 2024, 7 pages.
Extended Search Report for EP Application No. 24170442.8, mailed on Jun. 18, 2024, 8 pages.
International Search Report for PCT Application No. PCT/IB2021/057004, mailed on Jan. 5, 2022, 4 pages.
International Search Report for PCT International Application No. PCT/IB2021/056996, mailed on Jan. 4, 2022, 3 pages.
Marcos, "Expansibility of vermiculites irradiation with microwaves", Applied Clay Science, 2011, vol. 51, No. 1-2, pp. 33-37.
Office Action for EP Application No. 24166024.0, dated Jan. 17, 2025, 5 pages.
Sherimov, "Researching of Electrodynamic Systems for Hydrated Micas Microwave Processing", 2018 IEEE Conference of Russian Young Researchers in Electrical and Electronic Engineering (IEEE), Feb. 2018, pp. 512-515.
Zacarias, "Thermal Analysis of Vermiculite Using Microwave Heating", I2MTC 2018—2018 IEEE International Instrumentation and Measurement Technology Conference: Discovering New Horizons in Instrumentation and Measurement, Proceedings, May 2018, pp. 1-5.
Feng, "Thermal runaway mechanism of lithium ion battery for electric vehicles: A review" Energy Storage Materials, 2018, vol. 10, pp. 246-267.
International Search Report for PCT International Application No. PCT/IB2021/056993, mailed on Nov. 25, 2021, 4 pages.
Kang, "Mechanism of Heat Transfer through Porous Media of Inorganic Intumescent Coatings in Cone Calorimeter Testing", Polymer, 2019, vol. 11, No. 2, pp. 221.
Molerus, "Heat transfer in moving beds with a stagnant interstitial gas", International Journal of Heat and Mass Transfer, 1997, vol. 40, No. 17, pp. 4151-4159.
Nutz, "Low Thermal Conductivity through Dense Particle Packings with Optimum Disorder" Advanced Materials, 2018 vol. 30, No. 14, pp. 1704910(1-8).
Pocius, Adhesion and Adhesives Technology: an Introduction, pp. 216-245, (1997).
Walker, "Chemical Exfoliation of Vermiculite and the Production of Colloidal Dispersions", Science, Apr. 1967, vol. 156, No. 3773, pp. 385-387.
ASTM C553-13, "Standard Specification for Mineral Fiber Blanket Thermal Insulation for Commercial and Industrial Applications", 2019, pp. 1-5.

* cited by examiner

BATTERY CELL THERMAL RUNAWAY BARRIER

CROSS REFERENCE TO RELATED APPLICATIONS

This application is a national stage filing under 35 U.S.C. 371 of PCT/IB2021/056993, filed Jul. 30, 2021, which claims the benefit of Provisional Application No. 63/058, 863, filed Jul. 30, 2020, the disclosure of which is incorporated by reference in its/their entirety herein.

The present invention relates to a barrier for at least significantly slowing down a thermal runaway event within a battery assembly, e.g., like a battery assembly used in an electric vehicle.

BACKGROUND

Electric motors used in electric or hybrid vehicles (e.g., automobiles) are powered, at least in part, by batteries. Lithium ion batteries are typically used in such applications, and they are available in three forms: prismatic cells, pouch cells or cylindrical-shaped cells. These batteries are disposed within the vehicle compactly to save space. Sometimes one or more of the battery cells or battery modules experience a thermal runaway event, which can result in many if not all of the battery cells or battery modules overheating and being destroyed. There is a desire in the industry to prevent, stop or at least significantly slowing down such a thermal runaway event.

The industry has developed a number of thermal barrier elements, which require multiple layers of various inorganic materials to perform such a function (see, e.g., U.S. Pat. No. 8,541,126B2).

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY OF THE INVENTION

The present inventors have discovered that suitable thermal barrier elements can be used without the need for multiple layers of inorganic nonmetallic materials.

In one aspect of the present invention, a thermal runaway barrier is provided that is operatively adapted for being disposed between battery cells of a battery assembly and for at least significantly slowing down a thermal runaway event within the battery assembly. The thermal runaway barrier consists of or consists essentially of a single-layer of a nonwoven fibrous thermal insulation comprising a fiber matrix of inorganic fibers, thermally insulative inorganic particles dispersed within the fiber matrix, and a binder dispersed within the fiber matrix so as to hold together the fiber matrix. An optional organic encapsulation layer may also be included for encapsulating the single-layer of nonwoven fibrous thermal insulation.

In another aspect of the present invention, a battery cell module or assembly for an electric vehicle is provided. The battery cell module or assembly comprises a plurality of battery cells disposed in a housing, and a plurality of thermal runaway barriers according to the present invention. The battery cells are lined up in a row or stack, with one thermal runaway barrier being disposed between each pair of adjacent battery cells, or between a predetermined number of battery cells (e.g., after every third battery cell), or between battery modules.

In a further aspect of the present invention, a method is provided for making a thermal runaway barrier according to the present invention, where the method comprises forming the layer of nonwoven fibrous thermal insulation using a wet-laid process or dry-laid process.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

Descriptions corresponding to the included figures can be within this description.

DETAILED DESCRIPTION OF CERTAIN EMBODIMENTS

Figure 1:
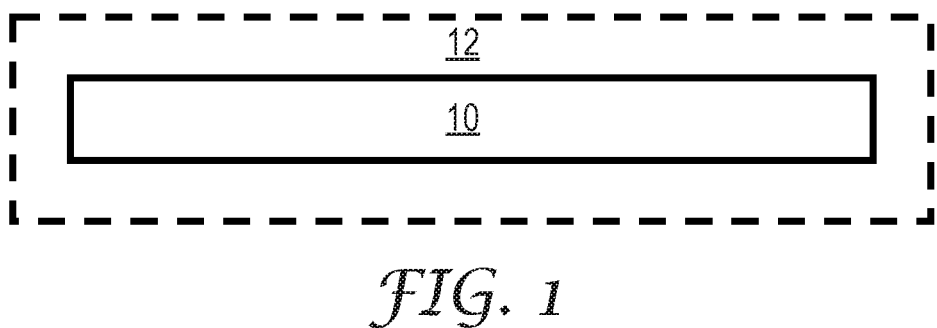
FIG. 1 is a schematic end view of a fiber matrix layer and an optional encapsulation layer that may be used in a thermal runaway barrier application.

In describing preferred embodiments of the invention, specific terminology is used for the sake of clarity. The invention, however, is not intended to be limited to the specific terms so selected, and each term so selected includes all technical equivalents that operate similarly.

As used herein, the terms "preferred" and "preferably" refer to embodiments described herein that can afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein. Relative terms such as left, right, forward, rearward, top, bottom, side, upper, lower, horizontal, vertical, and the like may be used herein and, if so, are from the perspective observed in the drawing. These terms are used only to simplify the description, however, and not to limit the scope of the invention in any way.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Where applicable, trade designations are set out in all uppercase letters.

The term "and/or" means one or all of the listed elements or a combination of any two or more of the listed elements (e.g., preventing and/or treating an affliction means preventing, treating, or both treating and preventing further afflictions).

As used herein, the term "or" is generally employed in its sense including "and/or" unless the content clearly dictates otherwise.

Also herein, the recitations of numerical ranges by endpoints include all numbers subsumed within that range (e.g., 1 to 5 includes 1, 1.5, 2, 2.75, 3, 3.80, 4, 5, etc.).

"Ambient conditions" means at 25° C. and 101.3 kPa pressure.

"Average" means number average, unless otherwise specified.

"Continuous" means extending across a single, unified area along a given layer (a perforated sheet can be continuous);

"Cure" refers to exposing to radiation in any form, heating, or allowing to undergo a physical or chemical reaction that results in hardening or an increase in viscosity.

"Discontinuous" means extending across a plurality of discrete areas along a given layer, where the discrete areas are spaced apart from each other;

"Size" refers to the longest dimension of a given object or surface.

"Substantially" means to a significant degree, as in an amount of at least 50%, 60, 70, 80, 90, 95, 96, 97, 98, 99, 99.5, 99.9, 99.99, or 99.999%, or 100%.

"Thickness" means the distance between opposing sides of a layer or multilayered article.

The recitation of numerical ranges by endpoints includes all numbers subsumed within that range in increments commensurate with the degree of accuracy indicated by the end points of the specified range (e.g., for a range of from 1.000 to 5.000, the increments will be 0.001, and the range will include 1.000, 1.001, 1.002, etc., 1.100, 1.101, 1.102, etc., 2.000, 2.001, 2.002, etc., 2.100, 2.101, 2.102, etc., 3.000, 3.001, 3.002, etc., 3.100, 3.101, 3.102, etc., 4.000, 4.001, 4.002, etc., 4.100, 4.101, 4.102, etc., 5.000, 5.001, 5.002, etc. up to 5.999) and any range within that range, unless expressly indicated otherwise.

The term "polymer" will be understood to include polymers, copolymers (e.g., polymers formed using two or more different monomers), oligomers and combinations thereof, as well as polymers, oligomers, or copolymers that can be formed in a miscible blend.

The following Examples have been selected merely to further illustrate features, advantages, and other details of the invention. It is to be expressly understood, however, that while the Examples serve this purpose, the particular ingredients and amounts used as well as other conditions and details are not to be construed in a manner that would unduly limit the scope of this invention.

Referring to FIG. 1, a fiber matrix layer 10 useful in a thermal runaway barrier application contains nonwoven inorganic (i.e., nonmetallic) or otherwise heat resistant fibrous insulation material, thermally insulative ceramic or otherwise nonmetallic inorganic particles, and an organic or inorganic binder. As used herein, nonmetallic means it is not a metal or metal alloy. Optionally, the fiber matrix layer 10 is encapsulated with an organic polymeric layer 12.

Figure 2:
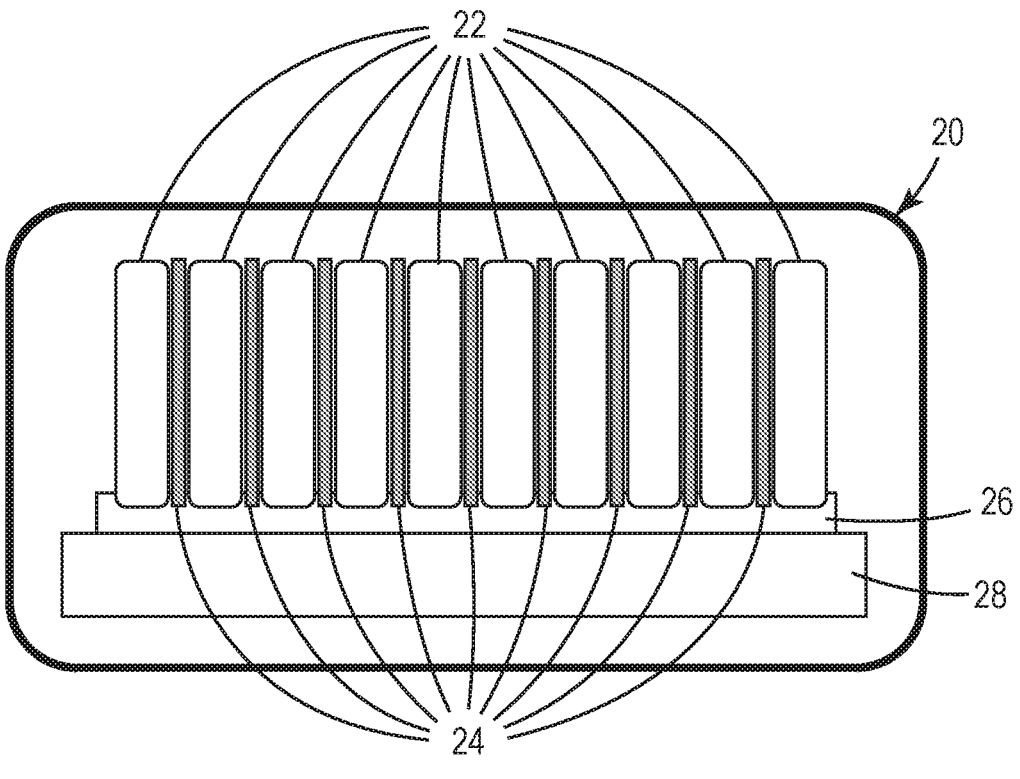
FIG. 2 is a schematic side view of a battery module of battery cells, with thermal runaway barriers disposed between adjacent battery cells.

Referring to FIG. 2, an exemplary battery module 20 includes an assembly of battery cells 22 and a plurality of thermal runaway barriers 24. Each thermal runaway barrier 24 is in the form of a single fiber matrix layer 10, with or without an encapsulation 12, and that can be made from the exemplary materials described herein. A thermal runaway barrier 24 can be disposed between adjacent battery cells 22, between groups of cells 22, or both, at one or more locations throughout the battery module 20. Typically, the battery module 20 rests above a cooling plate 26 and a tray 28.

Figure 3:
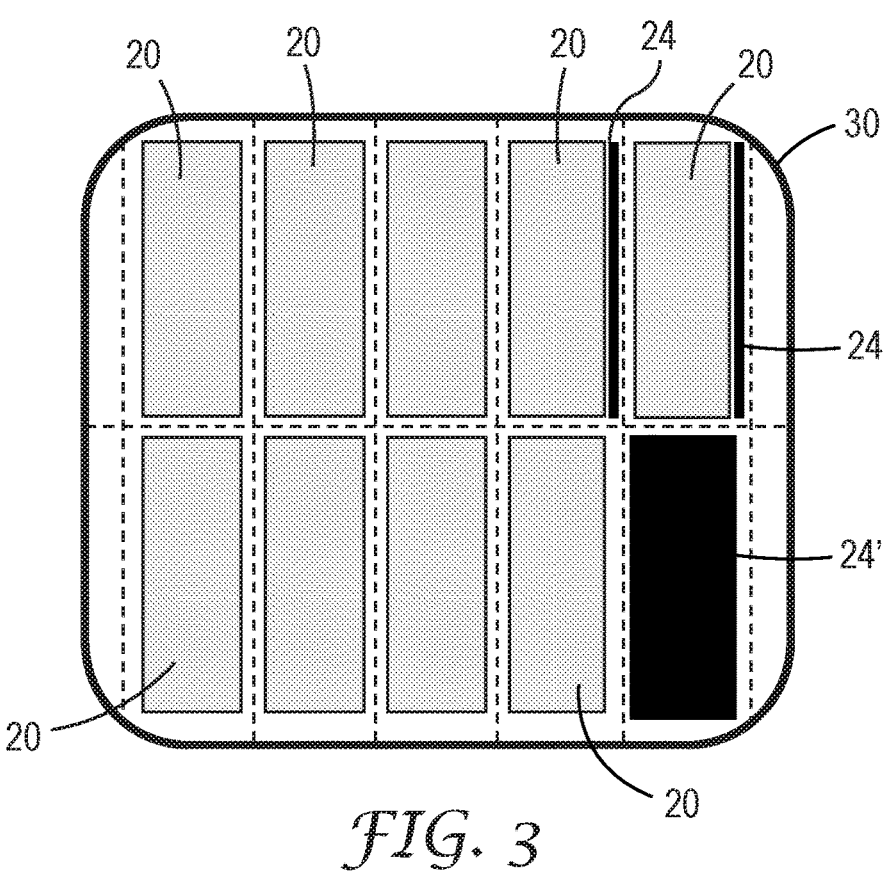
FIG. 3 is a schematic top view of a battery pack of battery modules, with thermal runaway barriers placed between adjacent battery modules and/or on the top of the battery modules.

Referring to FIG. 3, an exemplary battery pack 30 includes a plurality of battery modules 20, which may each have its own cooling plate 26 and tray 28 or all of the modules 20 may share the same cooling plate 26 and tray 28. A thermal runaway barrier 24, formed from the exemplary materials described herein, can be disposed between one or more of all adjacent battery modules 20, on the top of one or more or all of the battery modules 20 (see reference number 24'), or any combination of both. A thermal runaway barrier 24 may also be dimensioned so as to cover the tops of all of the battery modules 20.

Figure 4:
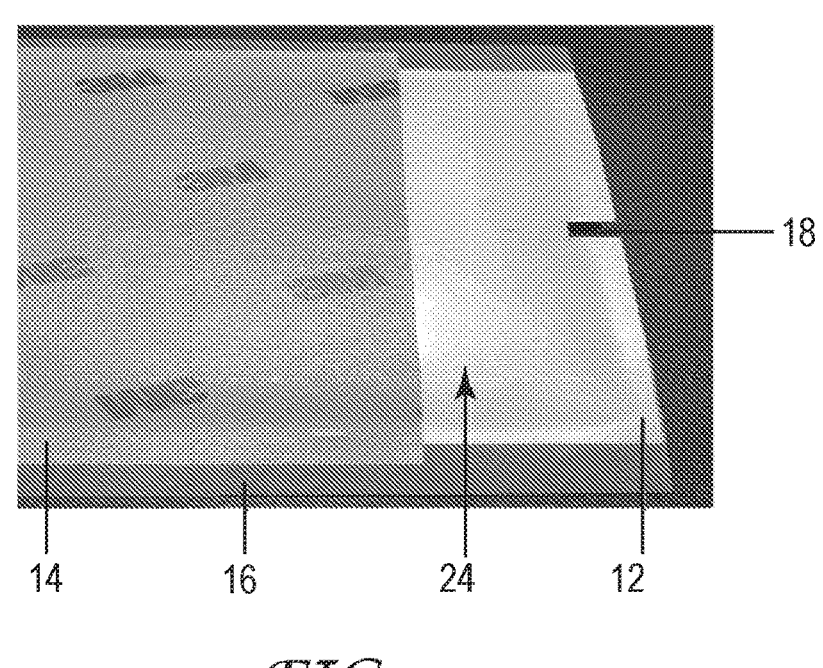
FIG. 4 is a photographic perspective view of a thermal runaway barrier encapsulated with an adhesive-backed organic polymeric layer with release liners and an expanding gas outlet/notch.

Referring to FIG. 4, an exemplary thermal runaway barrier 24 includes a single fiber matrix layer (not shown) encapsulated with an organic polymeric layer 12 that covers both sides and the peripheral edge of the fiber matrix layer. In one embodiment, the major opposite faces of the encapsulating layer 12 are coated with an adhesive (e.g., a pressure sensitive adhesive) protected by corresponding release liners 14 and 16. It is preferable for the encapsulating layer 12 to include one or more outlets or openings 18 (e.g., in the form of a notch) that allows air (e.g., hot air) or other gases to escape from inside the encapsulation 12, rather than cause the encapsulation 12 to swell and expand like a balloon, e.g., when the air trapped in the encapsulation 12 is heated to an elevated temperature (e.g., when the temperature of one or more of the adjacent battery cells 20 increases).

Figure 5:
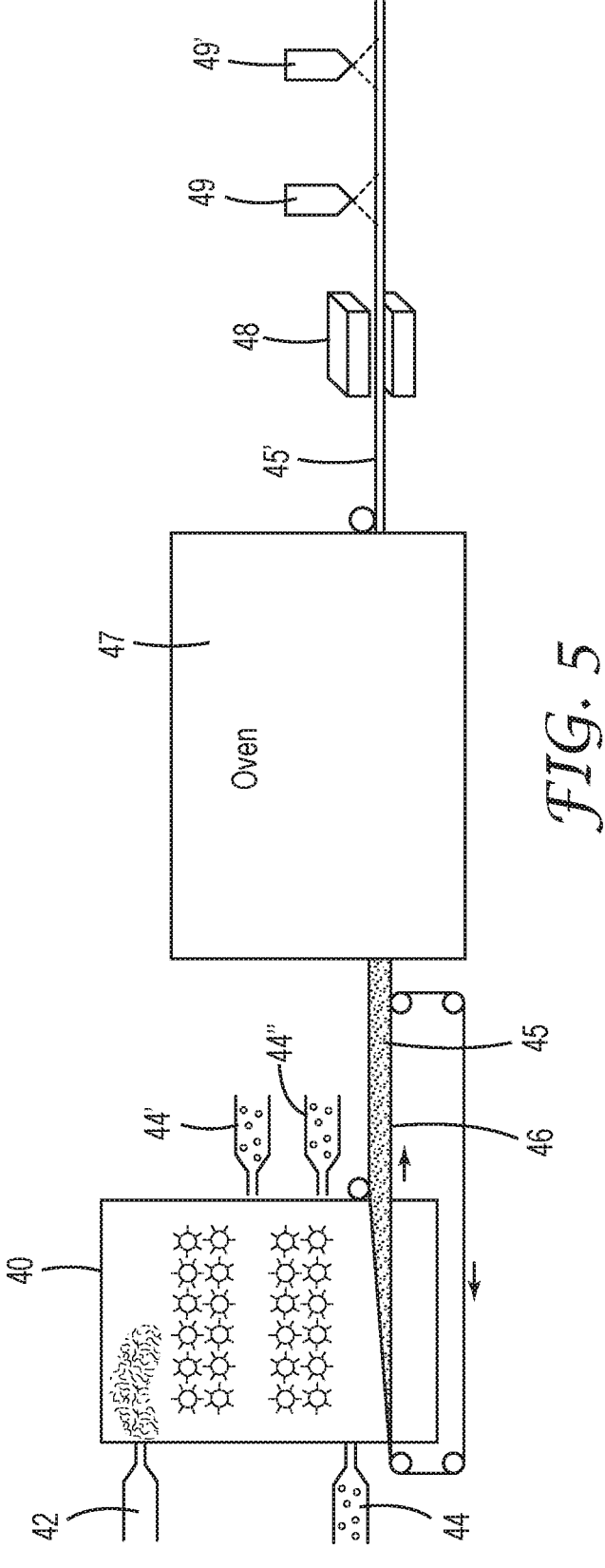
FIG. 5 is a schematic side view of a Dry-laid process for manufacturing a battery cell thermal runaway barrier, according to one embodiment of the present invention.

Referring to FIG. 5, a conventional dry-laid manufacturing equipment and processes can be used to manufacture thermal runaway barriers 20 according to the invention.

Examples of such equipment and processes can be found described in U.S. Pat. No. 9,580,848 (Henderson et al.), U.S. Pat. No. 9,475,034 (Vincent et al.), U.S. Pat. No. 7,491,354 (Anderson), and U.S. Pat. No. 6,808,664 (Falk et al.). Such equipment can include a chamber or forming box 40 with multiple feeder inlets, including an inlet 42 for feeding any desired combination of fibers, binder and particles into the box 40, and multiple inlets 44, 44' and 44" for feeding any desired number or type of filler materials into the box 40. After the fibers are combined and mixed together with the other ingredients, the resulting nonwoven fibrous material 45 is deposited onto a belt 46 that conveys the material 45 into, through and out of a baking oven 47 where the binder is cured at least so that the fibrous material 45 can be further processed. The resulting cured nonwoven fibrous material 45' is then die-cut, laser-cut, water-jet cut, or otherwise processed into individual nonwoven fiber layers 10 (not shown), which are each then processed at an encapsulation station 48, e.g., by having a polymeric film 12 (not shown) laminated to opposite sides of each layer 10. An optional hot melt adhesive or pressure sensitive adhesive can be applied to one or both sides of the encapsulate 12 at corresponding spray stations 49 and 49'. A protective release liner (not shown) can be subsequently applied to each adhesive surface.

Figure 6:
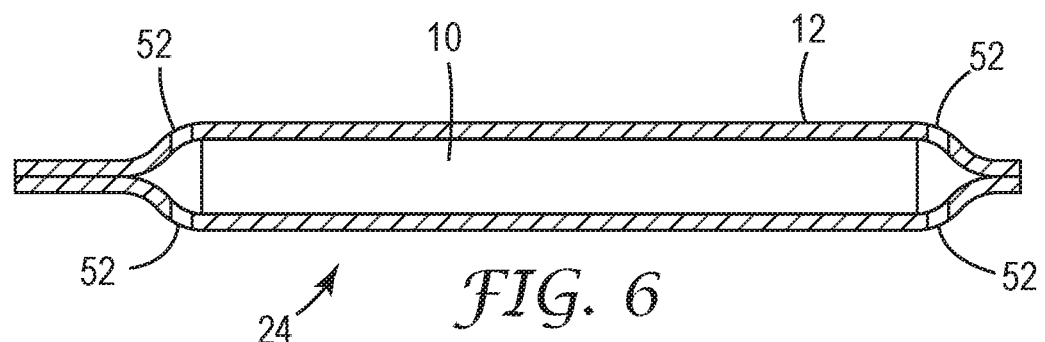
FIG. 6 is a cross-sectional view of one embodiment of a thermal runaway barrier showing multiple expanding gas vent holes formed through the encapsulating film, according to one embodiment of the invention.

Referring to FIG. 6, one embodiment of a thermal runaway barrier 24 according to the invention includes one or more vent holes 52 formed through one or both layers of the encapsulating film 12. The vent holes 52 can have any desired shape (e.g., circular, rectangular, oval, etc.), and preferably the vent holes 52 are formed through a portion of the film 12 located beyond the periphery of the encapsulated fibrous layer 10 and still within the periphery of the encapsulation 12, while also providing a path for expanding gases (e.g., air) to escape out of the space containing the fibrous layer 10. The number, size and location of these vent holes 52 can vary as desired.

Figure 7:
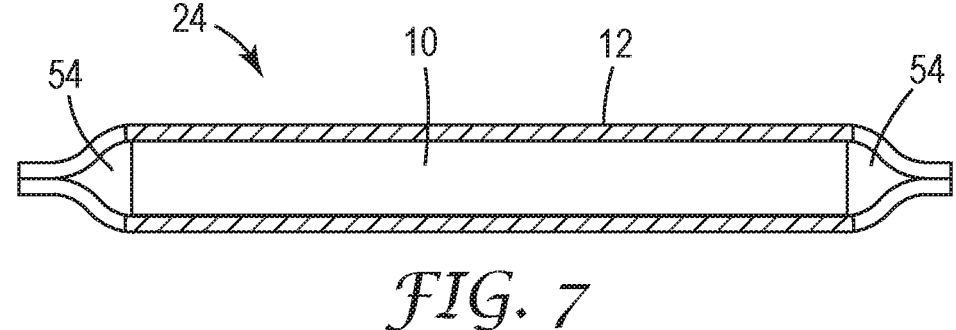
FIG. 7 is a cross-sectional view of another embodiment of a thermal runaway barrier showing multiple expanding gas vent holes in the form of notches formed through the encapsulating film, according to another embodiment of the invention.

Referring to FIG. 7, another embodiment of a thermal runaway barrier 24 according to the invention includes two vent holes 54, each in the form of a notch formed through the encapsulating film 12. The vent holes 54 can have any desired shape (e.g., semicircular, rectangular, semioval, etc.), and preferably the notches 54 are formed through a portion of the film 12 located beyond the periphery of the encapsulated fibrous layer 10 and past the periphery of the encapsulation 12, while also providing a path for expanding gases (e.g., air) to escape out of the space containing the fibrous layer 10. The number, size and location of these notches 54 can vary as desired.

Figure 8:
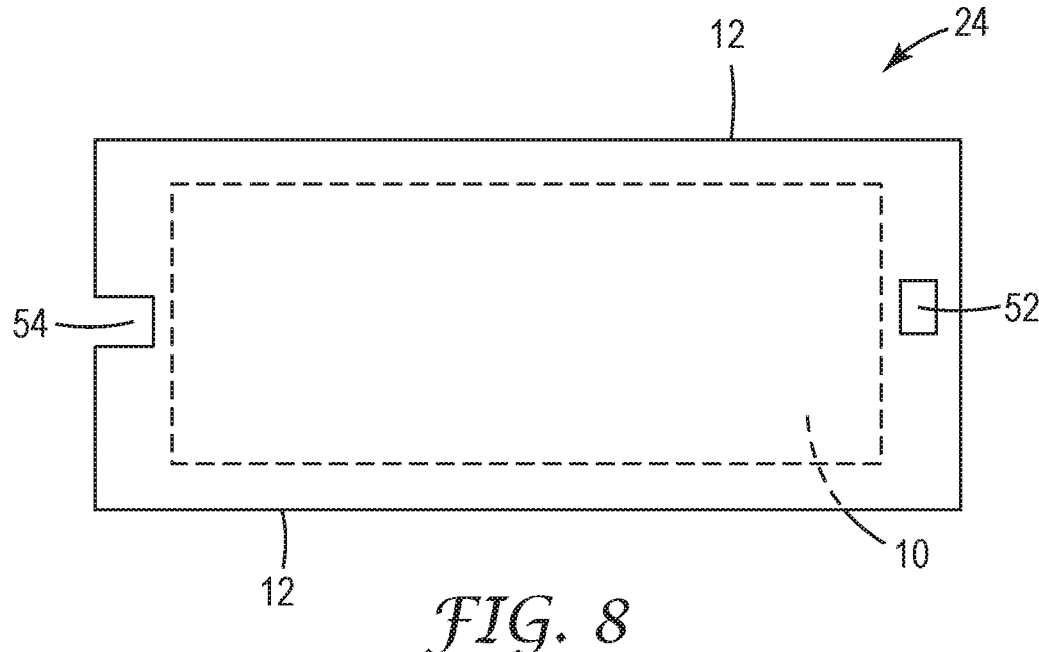
FIG. 8 is a top plan view of an additional embodiment of a thermal runaway barrier with two different types of expanding gas vent holes formed through the encapsulation film.

Referring to FIG. 8, an additional embodiment of a thermal runaway barrier 24 according to the invention includes two different types of vent holes 52 and 54 formed through the encapsulation 12, like those described above relative to FIGS. 6 and 7.

TABLE 1

| Test Materials | | |
| --- | --- | --- |
| Material | Description | Source |
| AG | Silica aerogel with a particle size of 100-700 micrometer and a pore size of 20 nanometers available under the designation ENOVA Aerogel IC3110 | Cabot Corp, Boston, MA, United States |
| EAF68 | Aqueous polymer dispersed pressure sensitive adhesive available under the designation VINNAPAS EAF 68 Vinyl Acetate Ethylene | Wacker Chemie AG, München, Germany |
| EVERM | Expanded vermiculite | Sun Gro, Agawam, MA, United States |
| EXP | Sodium silicate intumescent powder available under the trade designation "EXPANTROL" | 3M Company, St. Paul, MN, United States |
| EXPERL | Expanded perlite available under the designation EUROCELL 300 | Europerl, Pölten, Austria |
| FB | Acrylic water-based spray adhesive available under the trade designation "FASTBOND" 4224 NF | 3M Company |
| FS | Fumed silica with an average particle size of 0.2-0.3 micrometers available under the trade designation CAB-O-SIL H-5 | Cabot Corp, Boston, MA, United States |
| H2345 | Hot melt pressure sensitive adhesive available under the designation THERMOGRIP H2345-E71 | Bostik, Inc, Milwaukee, WI. United States |
| K1 | Soda-lime-borosilicate hollow glass microspheres with a density of 0.125 g/cc and a median particle size of 65 micrometer available under the designation Glass Bubbles K1 | 3M Company |
| LDM | Alkaline earth silicate fiber with a mean fiber diameter of 3.0-3.5 micrometer available under the designation SAFFIL LDM | Unifrax, Tonawanda, NY, United States |
| PA | Copolyamide powder adhesive with a granular size of 100-500 micrometer available under the designation 5350 | Shaetti AG, Wallisellen, Switzerland |
| PERL | Raw, unexpanded perlite | AGStein Aktiengesellschaft für Steinindustrie, Neuwied, Germany |
| PP | 0.02-millimeter polypropylene transparent film | Charter-Nex Films, Superior, WI, United States |
| SUM | Alkaline earth silicate fibers, mean fiber diameter of 3-4 micrometers, available under the trade designation NUTEC Supermag | Nutec Fibratec, S.A. de C.V., Mexico |
| SW+ | Alkaline earth silicate fibers with a mean fiber diameter of 2.5-3.4 micrometers available under the trade designation "SUPERWOOL PLUS" | Morgan Advanced Materials, Windsor, United Kingdom |

TABLE 1-continued

| | Test Materials | |
| --- | --- | --- |
| Material | Description | Source |
| T255 | Polyester/polyethylene bi-component staple fibers, 1.3 dtex and 6-millimeter length available under the trade designation T255 | Trevira GmbH, Bobingen, Germany |
| VERM1 | Vermuculite, 0.3-0.8 mm particle size | Cometals, Inc, New York, NY, United States |
| VERM2 | Vermuculite 0.3-1.0 mm particle size | Cometals, Inc, New York, NY, United States |
| VERM3 | Vermuculite 3.0-8.0 mm particle size | Cometals, Inc, New York, NY, United States |
| WDS | Microporous inorganic silicate insulation available under the designation WDS ® | Morgan Advanced Materials |

Test Methods

Hot-Side/Cold-Side Test 1 (HCST1)

In an MTS Insight 5 kN tensile test machine (obtained from MTS Insight of Eden Prairie, Minn., United States), a bottom platen was heated to 600° C., and a sample was placed on top of it. The upper platen, with a thermocouple embedded, was lowered such that the distance between the two platens was at 1.6 mm. The temperature increase at the cold-side was recorded with respect to time (continuously) until it reached 900 seconds (15 minutes).

Hot-Side/Cold-Side Test 2 (HCST2)

In a 10 kN tensile test machine (obtained from ZWICK-ROELL of Ulm, Germany), a top platen was heated to 600° C. and a sample was placed on a bottom platen with a thermocouple embedded set at ambient temperature. A heat shield was used to cover the sample to ensure that it stayed at ambient temperature. The heat shield was then removed, and the upper platen was lowered with pressure held at 1 MPa. The time the sample took reach a temperature of 150° C. (302° F.), designated t(150° C.), was recorded.

Shear Strength:

The methods of ASTM273C 273M were followed. A five-minute shear speed was used.

Thermal Conductivity Test:

Thermal conductivity measurements values were obtained using a Thermal Constants Analyzer, Model TPS 2500S obtained from Hot Disk® AB of Goteborg, Sweden. Measurements were taken by choosing the Isotropic/Bulk (Type I) module within the software. The measurements were run using a Kapton 5465 sensor (Hot Disk®) having a diameter of 3.2 mm. As specified by the manual, the samples should have a lateral dimension that is 1.5 to 2.0 times the radius of the sensor. The sample thickness should also be equivalent or greater than the radius of the sensor. To ensure that the thickness was sufficiently greater than the radius of the sensor, three to four layers of a sample were stacked on each side of the sensor and a small pressure was applied to ensure that layers were all in contact with one another.

Specified parameters were 1) measurement time in seconds and 2) heating power in mW. The sample temperature was inputted as the ambient room temperature. The measurement was then executed as defined in the TPS Manual.

The results were analyzed by clicking on "Calculate" within the software and selecting the "Standard Analysis" option. After the measurement, several graphs were presented by the software, including the "Transient" graph and the "Residual" graph. The transient graph displays the temperature increase of the sensor during the heating of the sample up to 200 points. The first pass at analyzing the results will start at point 10 and include everything up to point 200 on the transient. If the residual graph does not look like a random scatter of points, a smaller subset of datapoints was used for the analysis. This was done by trimming points from the beginning and end of the measurement. As a rule, the result was not reliable if less than 50 points are used in the analysis. In addition to satisfying the quality of the residual plot, several other numerical requirements were defined including "probing depth (PD)", "temperature increase (TI)", "total to characteristic time (TCT)", and "mean deviation (MD)" as specified in the manual. For these specifications: the PD must be less than the thickness of the sample, the TI must be between 0.4 K and 4.0 K, the TCT must be between 0.33 and 1.0, and the MD must be a magnitude of 10-4 or better. If these five criteria were not met, the heating power and measurement times were adjusted. The settings were iterated until an accurate measurement was made, where accuracy was defined by satisfying all the numerical requirements laid out in the manual. Thermal conductivity values in W/mK were measured and recorded for tested samples.

Examples 1-8 (EX1-EX8) and Comparative Examples 1-2 (CE1-CE2)

For Examples 1, 3, and 5-7, combinations of staple fibers by weight percent (as identified in Table 2) were weighed and premixed by hand before placing on top of a feeding belt. The fiber material was processed (i.e., fed from the top) through an air-laid processer, like that disclosed in U.S. Pat. No. 7,491,354, where the fibers were opened and dispersed into an air stream, then collected on a screen belt. Details of such air-laid processing apparatus and methods of using such apparatus in forming air-laid webs can be found described in U.S. Pat. No. 9,580,848 (Henderson et al.), U.S. Pat. No. 9,475,034 (Vincent et al.), U.S. Pat. No. 7,491,354 (Anderson), and U.S. Pat. No. 6,808,664 (Falk et al.). Fillers by weight percent (as identified in Table 2) were top or side fed into the chamber or forming box of the air-laid processor. A volumetric feeder coupled with an air-driven horn was used to distribute the fillers into the web uniformly. The sample was then sent through a forced-air convection oven at 143.3° C. (290° F.) at a speed of 1.1 m/min.

For Examples 2 and 4, the process described in Example 1 of U.S. Pat. No. 5,869,010 (Langer) was followed. Samples were assembled containing fibers and fillers by weight percent as identified in Table 2 rather than the materials identified in U.S. Pat. No. 5,869,010.

For Example 8, Example A of U.S. Pat. No. 9,399,864 (Samanta et al.) was followed with noted modifications. An aerogel slurry was prepared by adding 400 grams of Barlox 12 (obtained from Lonza Group of Basel, Switzerland) to 379 liters (100 gallons) of water at 43° C. (110° F.). The slurry was mixed. 200 grams of Foamaster 111 (obtained from BASF Group of Ludwigshafen, Germany) was added and the slurry was mixed. EAF68 by weight percent (as identified in Table 2) was added and mixed. AG by weight percent (as identified in Table 2) was then added and mixed. The slurry was mixed for fifteen minutes and 200 grams of MOJO MP 9307C was added and mixed. A fiber slurry was prepared by adding 717 grams of Microstrand 110X-481 (obtained from John Manville of Denver, Colo., United States) to 2271 liters (600 gallons) of water. The slurry was pulped for 60 seconds at 500 rpm. T255 by weight percent (as identified in Table 2) was added and the slurry was pulped for 30 seconds at 500 rpm. Another 1136 liters (300 gallons) of water was added to the slurry. 757 liters (200 gallons) of the fiber slurry was mixed with 379 liters (100 gallons) of the aerogel slurry and SW+ by weight percent (as identified in Table 2) was mixed in. The combined slurry was processed on a papermaking machine.

TABLE 2

Sample Compositions (Weight Percent)

| | SW+ | LDM | T255 | EAF68 | PA | AG | K1 | WDS | EXP |
|---|---|---|---|---|---|---|---|---|---|
| EX1 | 20 | 20 | 16 | 0 | 4 | 40 | 0 | 0 | 0 |
| EX2 | 0 | 62 | 0 | 8 | 0 | 0 | 30 | 0 | 0 |
| EX3 | 20 | 20 | 16 | 0 | 4 | 0 | 0 | 40 | 0 |
| EX4 | 0 | 52 | 0 | 8 | 0 | 0 | 0 | 0 | 40 |
| CE1 | 35 | 35 | 30 | 0 | 0 | 0 | 0 | 0 | 0 |
| EX5 | 15 | 15 | 30 | 0 | 0 | 40 | 0 | 0 | 0 |
| CE2 | 92 | 0 | 8 | 0 | 0 | 0 | 0 | 0 | 0 |
| EX6 | 72 | 0 | 8 | 0 | 0 | 20 | 0 | 0 | 0 |
| EX7 | 52 | 0 | 8 | 0 | 0 | 40 | 0 | 0 | 0 |
| EX8 | 59.5 | 0 | 2.5 | 8 | 0 | 30 | 0 | 0 | 0 |

The samples underwent HCST1 testing and the results are represented in Table 3.

TABLE 3

Hot-side/Cold-side Temperature Test Results (Basis Weight = 600 gsm) in Celsius (° C.)

| Time (Minutes) | EX1 | EX2 | EX3 | EX4 | CE1 | EX5 | CE2 | EX6 | EX7 | EX8 |
|---|---|---|---|---|---|---|---|---|---|---|
| 0 | 22.0 | 22.0 | 22.0 | 22.0 | 22.0 | 22.0 | 33.9 | 24.3 | 29.5 | 35.0 |
| 1 | 45.9 | 67.3 | 56.3 | 81.0 | 68.9 | 48.6 | 53.4 | 46.8 | 44.5 | 58.0 |
| 2 | 63.1 | 87.3 | 78.3 | 103.0 | 94.7 | 67.8 | 68.8 | 62.6 | 55.5 | 73.7 |
| 3 | 76.9 | 103.8 | 95.6 | 120.3 | 114.0 | 80.7 | 80.9 | 75.4 | 64.2 | 87.1 |
| 4 | 88.0 | 117.5 | 108.6 | 136.5 | 129.0 | 92.3 | 90.4 | 85.6 | 71.1 | 98.0 |
| 5 | 96.7 | 127.1 | 118.8 | 146.6 | 140.7 | 101.6 | 94.5 | 90.0 | 74.0 | 106.7 |
| 6 | 104.4 | 134.6 | 126.5 | 155.3 | 150.5 | 109.5 | 101.6 | 97.2 | 79.3 | 113.9 |
| 7 | 110.0 | 140.8 | 133.1 | 162.1 | 158.0 | 115.4 | 110.3 | 105.8 | 85.5 | 120.1 |
| 8 | 115.3 | 145.7 | 138.5 | 168.1 | 164.6 | 119.6 | 114.9 | 110.2 | 88.8 | 125.3 |
| 9 | 119.2 | 150.0 | 143.1 | 173.0 | 169.9 | 124.6 | 118.9 | 113.9 | 91.7 | 129.7 |
| 10 | 122.6 | 153.7 | 147.0 | 177.3 | 174.5 | 128.1 | 122.2 | 117.0 | 94.1 | 133.6 |
| 11 | 125.7 | 157.0 | 150.5 | 181.3 | 178.5 | 131.5 | 125.2 | 119.7 | 96.1 | 137.0 |
| 12 | 128.4 | 159.8 | 153.4 | 184.5 | 181.9 | 131.9 | 127.6 | 121.9 | 97.8 | 139.9 |
| 13 | 130.8 | 162.4 | 156.1 | 187.5 | 184.9 | 140.2 | 129.8 | 124.0 | 99.3 | 142.6 |
| 14 | 132.8 | 164.6 | 158.6 | 190.0 | 187.5 | 137.7 | 131.8 | 125.8 | 100.6 | 145.0 |
| 15 | 134.7 | 166.5 | 160.8 | 192.0 | 189.9 | 141.2 | 133.6 | 127.4 | 101.8 | 147.1 |

Examples 9-34 (EX9-EX34) and Comparative Examples 3-8 (CE3-CE8)

The 'General Procedure for Preparing Fibrous Sheet' as described in U.S. Patent Application No. 2010/0115900 with material substitution as identified in Table 4 was followed.

Tap water (3 liters, 18° C.) and 60 grams (g) of inorganic fibers and cleaned to a shot (i.e. impurities) content of less than 50 percent by weight) were added to a GT800 Classic blender (obtained from Rotor Lips Ltd, Uetendorf, Switzerland). The blender was operated on low speed for five seconds. The resultant slurry was rinsed into a RW16 mixing container equipped with a paddle mixer (obtained from IKA-Werke GmbH, Staufen, Germany) using one liter of tap water (18° C.). The slurry was diluted with an additional one liter of tap water (18° C.). The diluted slurry was mixed at medium speed to keep solids suspended. Defoaming agent (obtained under the trade designation "FOAMASTER 111" (0.3 g) from Henkel, Edison, N.J.) and ethylene-vinyl acetate terpolymer latex (obtained under the trade designation "AIRFLEX 600BP" (6.0 g, 55 percent by weight solids) from Air Products were added. Flocculent is added dropwise in amounts as indicated in Table 4. Thermally insulative particles were then added as indicated in Table 4. The mixer speed was increased and mixing continued for from 1 to 5 minutes. The paddle mixer was removed, and the slurry was poured into a 20 cm×20 cm (8 inches×8 inches) sheet former (obtained from Williams Apparatus Co, Watertown, N.Y., United States) and drained. The surface of the drained sheet was rolled with a rolling pin to remove excess water. Then, the sheet was pressed between blotter papers at a surface pressure of 90-97 kPa (13-14 psi) for five minutes. The sheet was then dried at 150° C. in a forced air oven for 10-15 minutes and allowed to equilibrate overnight while exposed to the ambient atmosphere. The thickness and basis weight of the samples were measured at a constant pressure of 4.9 kPa, and are recorded in Table 5. For Examples 15-25 (EX15-EX25) the vermiculite material used in these samples were either pre-heated to permanently pre-expand the vermiculite, before being used to make the samples, or post-heated to permanently post-expand the vermiculite, after the samples were made, at specific time and temperature conditions. For EX21, the vermiculite was pre-heated at 300° C. for 6 hours before sample assembly. For EX22 and EX23, the vermiculite was heated at 450° C. for 30 minutes after sample assembly. For EX24, the vermiculite was pre-heated at 500° C. for 30 minutes before sample assembly. For EX25 EX33, and EX34, the vermiculite in the sample was pre-heated at 1000° C. for 30 minutes before sample assembly.

TABLE 4

| | SW+ | SUM | EAF68 | VERM1 | EXVERM | PERL | EXPERL |
|---|---|---|---|---|---|---|---|
| | | | | Sample Compositions (Weight Percent) | | | |
| CE3 | 95 | 0 | 5 | 0 | 0 | 0 | 0 |
| CE4 | 90 | 0 | 10 | 0 | 0 | 0 | 0 |
| CE5 | 90 | 0 | 10 | 0 | 0 | 0 | 0 |
| CE6 | 90 | 0 | 10 | 0 | 0 | 0 | 0 |
| CE7 | 90 | 0 | 10 | 0 | 0 | 0 | 0 |
| CE8 | 90 | 0 | 10 | 0 | 0 | 0 | 0 |
| EX9 | 50 | 0 | 5 | 45 | 0 | 0 | 0 |
| EX10 | 50 | 0 | 5 | 45 | 0 | 0 | 0 |
| EX11 | 50 | 0 | 5 | 45 | 0 | 0 | 0 |
| EX12 | 50 | 0 | 5 | 45 | 0 | 0 | 0 |
| EX13 | 50 | 0 | 5 | 45 | 0 | 0 | 0 |
| EX14 | 50 | 0 | 5 | 45 | 0 | 0 | 0 |
| EX15 | 0 | 50 | 5 | 0 | 45 | 0 | 0 |
| EX16 | 0 | 50 | 5 | 0 | 45 | 0 | 0 |
| EX17 | 0 | 50 | 5 | 0 | 45 | 0 | 0 |
| EX18 | 0 | 50 | 5 | 22.5 | 22.5 | 0 | 0 |
| EX19 | 65 | 0 | 5 | 0 | 30 | 0 | 0 |
| EX20 | 65 | 0 | 5 | 0 | 30 | 0 | 0 |
| EX21 | 50 | 0 | 5 | 0 | 45 | 0 | 0 |
| EX22 | 50 | 0 | 5 | 0 | 45 | 0 | 0 |
| EX23 | 50 | 0 | 5 | 0 | 45 | 0 | 0 |
| EX24 | 50 | 0 | 5 | 0 | 45 | 0 | 0 |
| EX25 | 50 | 0 | 5 | 0 | 45 | 0 | 0 |
| EX26 | 0 | 23 | 8 | 0 | 0 | 0 | 69 |
| EX27 | 0 | 23 | 8 | 0 | 0 | 0 | 69 |
| EX28 | 0 | 23 | 8 | 0 | 0 | 0 | 69 |
| EX29 | 0 | 47 | 6 | 0 | 0 | 0 | 47 |
| EX30 | 0 | 22 | 6 | 0 | 0 | 0 | 72 |
| EX31 | 0 | 70 | 5 | 0 | 0 | 25 | 0 |
| EX32 | 0 | 20 | 5 | 0 | 0 | 75 | 0 |
| EX33 | 65 | 0 | 5 | 0 | 30 | 0 | 0 |
| EX34 | 65 | 0 | 5 | 0 | 30 | 0 | 0 |

The samples underwent HCST2 testing and the results are represented in Table 5.

TABLE 5

Hot-side/Cold-side Temperature Test Results

| | Thickness (mm) | Basis Weight (gsm) | t(150° C.) (seconds) |
|---|---|---|---|
| CE3 | 4.17 | 643 | 297 |
| CE4 | 2.68 | 413 | 162 |
| CE5 | 2.14 | 319 | 122 |
| CE6 | 1.16 | 207 | 63 |
| CE7 | 1.23 | 193 | 63 |
| CE8 | 1.04 | 161 | 52 |
| EX9 | 4.17 | 643 | 297 |
| EX10 | 2.74 | 614 | 182 |
| EX11 | 2.53 | 530 | 154 |
| EX12 | 1.73 | 394 | 111 |
| EX13 | 1.42 | 310 | 89 |
| EX14 | 1.23 | 252 | 73 |
| EX15 | 4.70 | 529 | 126 |
| EX16 | 2.15 | 437 | 109 |
| EX17 | 1.70 | 478 | 113 |
| EX18 | 1.95 | 499 | 105 |
| EX19 | 4.22 | 453 | 120 |
| EX20 | 5.45 | 606 | 197 |
| EX21 | 1.85 | 362 | 129 |
| EX22 | 2.87 | 490 | 205 |
| EX23 | 2.68 | 508 | 207 |
| EX24 | 1.92 | 341 | 127 |
| EX25 | 4.40 | 514 | 197 |
| EX26 | 4.59 | 208 | 208 |
| EX27 | 3.25 | 120 | 120 |
| EX28 | 3.74 | 186 | 186 |
| EX29 | 3.82 | 115 | 115 |

TABLE 5-continued

Hot-side/Cold-side Temperature Test Results

| | Thickness (mm) | Basis Weight (gsm) | t(150° C.) (seconds) |
|---|---|---|---|
| EX30 | 2.59 | 100 | 100 |
| EX31 | 2.00 | 540 | 97 |
| EX32 | 2.62 | 1197 | 139 |
| EX33 | 2.80 | 450 | 116 |
| EX34 | 3.42 | 550 | 141 |

Example 35 (EX35)

PP was laminated onto a sample as assembled in Example 5. Hand samples were hot pressed at 132° C. (270° F.) and 200 kPa on both sides. The edges were manually sealed using an impulse sealer which was at 149° C. (300° F.), and heated for 2 seconds, cooled for 10 seconds, with all the steps being conducted under a compressive force of 524 kPa (76 psi) pressure. The PP film thickness was 0.02 mm (1 mil). The 600 gsm sample underwent Shear Strength testing and the results are represented in Table 6.

Example 36 (EX36)

Hot melt adhesive H2345 was applied to the sample in Example 35 using a Nordson Altablue Gridmelter with a 15.24 cm (6 inch) melt blown adhesive die. The adhesive was heated at 193° C. (380° F.) and sprayed on to the web at 206.8 kPa (30 psi) air pressure and 20 RPM pump rate. The 600 gsm sample underwent Shear Strength testing and the results are represented in Table 6.

Example 37 (EX37)

FB was spray coated onto a sample as assembled in Example 35 using a ACCUSPRAY ONE Spray Gun System with PPS obtained from 3M Company of St. Paul, MN, United States. Hand samples were spray coated on one side and then flipped to coat the other side. The 600 gsm sample underwent Shear Strength testing and the results are represented in Table 6.

Example 38 (EX38)

PKHH Phenoxy Resin obtained from Gabriel Performance Products of Akron, OH, United States was dissolved in a 50% solution of methyl ethyl ketone (MEK) to create an adhesive. The MEK was evaporated at room temperature for 60 minutes. Two coatings of the adhesive were applied onto one side of a 0.076 mm (3 mil) PET film obtained from Dupont of Wilmington, DE, United States. Two coatings of the adhesive were applied onto a side of another 0.076 mm (3 mil) PET film. The thickness of the adhesive coating was 0.036 mm (1.4 mil). The adhesive coated PET sample films were placed onto the top and bottom side of a sample as assembled in Example 5. The 600 gsm sample underwent Shear Strength testing and the results are represented in Table 6.

TABLE 6

| | Encapsulated Sample Test Results | |
| --- | --- | --- |
| Example | | Shear Strength MPa |
| EX35 | | 0.27 |
| EX36 | | 0.27 |
| EX37 | | 0.26 |
| EX38 | | 1.28 |

Examples 39-40 (EX39-EX40)

Samples were assembled using procedures described in Examples 9-16 with the materials identified in Table 7. The thickness and basis weight of the samples were measured at a constant pressure of 4.9 kPa and are recorded in Table 8. The samples underwent HCST2 testing, and the results are represented in Table 8.

TABLE 7

| | Sample Compositions (Weight Percent) | | | |
| --- | --- | --- | --- | --- |
| | SW+ | EAF68 | VERM2 | VERM3 |
| EX39 | 50 | 5 | 45 | 0 |
| EX40 | 50 | 5 | 0 | 45 |

TABLE 8

| | Hot-side/Cold-side Temperature Test Results | | |
| --- | --- | --- | --- |
| | Thickness (mm) | Basis Weight (gsm) | t(150° C.) (seconds) |
| EX39 | 1.78 | 405 | 84.7 |
| EX40 | 2.65 | 723 | 413.8 |

Examples 41-57 (EX41-EX57)

Combinations of staple fibers by basis weight (as identified in Table 9) were weighed and processed through an air-laid processer. Details of the apparatus and methods of using the apparatus in forming air-laid webs are described in U.S. Pat. No. 9,580,848 (Henderson et al.), U.S. Pat. No. 9,475,034 (Vincent et al.), U.S. Pat. No. 7,491,354 (Anderson), and U.S. Pat. No. 6,808,664 (Falk et al.). The combined staple fibers were then processed again by the air-laid processor and a fumed silica filler was directly fed into the chamber of the air-laid processor by basis weight (as identified in Table 2). A screw feeder was used to distribute the fillers into the web uniformly. The web was sent through a forced-air convection oven at 148.89° C. (300° F.) at a speed between 0.25 m/min and 1.5 m/min. The thickness of the samples was between 0.5 to 15 mm.

The webs were then densified to a specified gap thickness using a hot press. Polytetrafluoroethylene (PTFE) coated fiberglass fabric sheets (obtained from McMaster-Carr of Elmhurst, IL United States) were placed on both sides of the samples and the samples were placed between two hot plates maintained at a temperature of 148.89° C. (300° F.). Pressure was applied for 30 to 120 seconds to activate the bi-component fibers (T255). The densified sample was then immediately placed between two plates maintained at room temperature under a pressure for 30 to 120 seconds, to set the web to the desired thickness.

TABLE 9

| | Sample Compositions (gsm) | | |
| --- | --- | --- | --- |
| | SW+ | T255 | FS |
| EX41 | 256 | 64 | 80 |
| EX42 | 192 | 48 | 160 |
| EX43 | 128 | 32 | 240 |
| EX44 | 384 | 96 | 160 |
| EX45 | 288 | 72 | 320 |
| EX46 | 192 | 48 | 480 |
| EX47 | 640 | 160 | 200 |
| EX48 | 480 | 120 | 400 |
| EX49 | 480 | 120 | 400 |
| EX50 | 480 | 120 | 400 |
| EX51 | 480 | 120 | 400 |
| EX52 | 480 | 120 | 400 |
| EX53 | 480 | 120 | 400 |
| EX54 | 320 | 80 | 600 |
| EX55 | 768 | 192 | 240 |
| EX56 | 576 | 144 | 480 |
| EX57 | 384 | 96 | 720 |

The samples underwent HCST2 testing, and the results are represented in Table 10. The actual thickness of the samples was measured by ASTM D5736-95 with the fiberglass fabric sheets removed. The plate pressure was calibrated at 0.002 psi (13.790 Pascal).

TABLE 10

| | Hot-side/Cold-side Temperature Test Results | | | | |
| --- | --- | --- | --- | --- | --- |
| | Target Thickness (mm) | Actual Thickness (mm) | Target Basis Weight (gsm) | Actual Basis Weight (gsm) | t(150° C.) (seconds) |
| EX41 | 1.00 | 0.99 | 400 | 387 | 35 |
| EX42 | 1.00 | 0.97 | 400 | 337 | 53 |
| EX43 | 1.00 | 1.09 | 400 | 324 | 287 |
| EX44 | 2.00 | 1.94 | 800 | 547 | 277 |
| EX45 | 2.00 | 1.96 | 800 | 697 | 737 |
| EX46 | 2.00 | 2.09 | 800 | 657 | 3600 |
| EX47 | 3.00 | 2.92 | 1000 | 837 | 230 |
| EX48 | 3.00 | 2.80 | 1000 | 743 | 3600 |
| EX49 | 2.00 | 2.02 | 1000 | 953 | 799 |
| EX50 | 3.00 | 2.83 | 1000 | 930 | 3600 |
| EX51 | 4.00 | 3.56 | 1000 | 857 | 3600 |
| EX52 | 6.00 | 5.94 | 1000 | 907 | 3600 |
| EX53 | 8.00 | 7.78 | 1000 | 933 | 3600 |
| EX54 | 3.00 | 2.80 | 1000 | 707 | 3600 |
| EX55 | 4.00 | 3.96 | 1200 | 1077 | 685 |
| EX56 | 4.00 | 3.90 | 1200 | 1097 | 3600 |
| EX57 | 4.00 | 3.90 | 1200 | 873 | 3600 |

Densities of 1000 gsm samples containing 40% fumed silica (represented in EX48-EX53) were computed by dividing the actual basis weight (gsm) by the actual thickness (mm). Density and the cold side temperature recorded after 3600 seconds of HSCT2 testing for EX48-EX53 is represented in Table 11. The table is organized in escending order by measured cold side temperatures.

TABLE 11

| | Density vs. Cold Side Temperature | |
| --- | --- | --- |
| | Density (gsm/mm) | Cold Side Temperature ° C. |
| EX49 | 472 | 180.9 |
| EX51 | 241 | 141.7 |
| EX53 | 120 | 140.2 |

TABLE 11-continued

| Density vs. Cold Side Temperature | | |
| --- | --- | --- |
| | Density (gsm/mm) | Cold Side Temperature ° C. |
| EX52 | 153 | 137.3 |
| EX50 | 329 | 134.6 |
| EX48 | 265 | 130.8 |

Thermal conductivity testing was performed, and the results are represented in Table 12.

TABLE 12

| Thermal Conductivity Test Results | |
| --- | --- |
| | Thermal Conductivity W/m · K |
| EX47 | 0.0531 |
| EX49 | 0.0708 |
| EX50 | 0.0481 |
| EX52 | 0.0508 |

Surprisingly, it has been found that fumed silica has a higher thermal conductivity than silica aerogel. It is believed that the thermal conductivity of the nonwoven fibrous thermal insulation without the fumed silica particles (i.e., the fiber matrix) is lower than the same fiber matrix with the fumed silica particles.

ADDITIONAL EMBODIMENTS

Battery Cell Thermal Runaway Barrier Embodiments

1. A thermal runaway barrier operatively adapted (i.e., designed, configured, shaped and/or dimensioned) or otherwise suitable for being disposed between adjacent battery cells (e.g., prismatic- or pouch-type battery cells) of a battery module or assembly (i.e., a series of battery cells stacked together in a row) such as that used to power an electric motor (e.g., like that used in an electric or hybrid vehicle) and for preventing, stopping or at least significantly slowing down a thermal runaway event within the battery module or assembly or between adjacent battery modules or assemblies, the thermal runaway barrier consisting essentially of or consisting only of:

a single-layer of a dry-laid or wet-laid nonwoven fibrous thermal insulation (e.g., in the form of a mat, sheet, strip, or three-dimensional thin-walled structure) comprising a fiber matrix of ceramic or otherwise nonmetallic (i.e., not a metal, metal alloy, or metal composite) inorganic fibers, thermally insulative ceramic or otherwise nonmetallic (i.e., not a metal, metal alloy, or metal composite) inorganic particles dispersed evenly, uniformly, generally or otherwise throughout or to the extent permitted by the manufacturing process (e.g., there can be a little sedimentation of the particles on the bottom of the mat in both the dry laid and wet laid processes) within the fiber matrix, and an organic or inorganic binder (e.g., organic or inorganic adhesive binder, organic or inorganic binder fibers that are needle punched, stitched or otherwise mechanically entangled into the fiber matrix so as to hold together the fiber matrix, etc.) dispersed evenly, uniformly, generally or otherwise throughout or to the extent permitted by the manufacturing process within the fiber matrix so as to bond together the inorganic filler particles and inorganic fibers or otherwise hold together the fiber matrix for as long as needed to at least survive the degree of handling required (e.g., during the encapsulation process) before being installed between battery cells; and an optional organic (e.g., polymeric, paper, etc.) encapsulation layer (e.g., one layer or multiple opposing sandwiching layers, with each layer being in the form of a film, coating, organic fibrous nonwoven or woven fabric, etc.) encapsulating all of, a majority of or a portion of at least one or both major faces and preferably also all of, a majority of or a portion of the peripheral edge of the single-layer of nonwoven fibrous thermal insulation so as to prevent or significantly reduce the shedding or loss of inorganic fibers or particles from the encapsulated single-layer of nonwoven fibrous thermal insulation.

The reduction of inorganic fiber or particle shedding is significant, when the number of inorganic fibers or particles lost is less than 10%, 5% or 1% by weight percent of the original fiber or particle content of the layer of nonwoven fibrous thermal insulation. The thinner the organic encapsulation layer (i.e., the lower the organic content of the barrier) the better the hot/cold test results.

The present thermal runaway barrier may also be used between battery modules or assemblies.

Inorganic binders, organic binders, or a combination of both can be useful according to the present invention and may include, e.g., those disclosed in U.S. Pat. No. 8,834, 759. An example of an inorganic binder useful in both dry-laid or wet-laid fiber processing can include particles of silicone that convert to fusible silica when heated. An organic-inorganic hybrid binder may also be useful such as, e.g., WACKER® MQ 803 TF, which is a co-hydrolysis product of tetra-alkoxy silane (Q unit) and trimethyl-alkoxy silane (M unit). The chemical structure of WACKER® MQ 803 TF can be seen as a three dimensional network of polysilicic acid units which are end-blocked with trimethylsilyl groups. Some residual ethoxy and hydroxy functions are present. The average molecular weight can be exactly controlled by the ratio of M and Q units. This ratio approx. is 0.67 for WACKER® MQ 803 TF.

Exemplary binder fibers include the use of bicomponent core-sheath polymeric fibers in a dry-laid process. In a wet-laid process, ethylene vinyl acetate latex dispersion binder, bicomponent core-sheath polymeric fibers, or a combination of both can be used. When a polymeric binder fiber is used, the binder can be activated by heating and compressing the nonwoven fibrous thermal insulation material. A combination of organic and inorganic binders can also be used.

As used herein, the term "consisting only of" indicates that the claimed thermal runaway barrier only covers structures with the recited elements.

As used herein, the term "consisting essentially of" indicates that the claimed thermal runaway barrier is able to exhibit the desired thermal insulation properties by using only the recited features/elements, without the need for additional layers of thermal insulation material. For example, the present inventive thermal runaway barrier does not need to include another layer of other thermal insulation material (e.g., a woven fabric or nonwoven structure of inorganic fibers). Therefore, with the "consisting essentially of" language, if a third party thermal runaway barrier (e.g., of a competitor) includes all of the features/elements in a claim of the present invention, as well as one or more additional features/elements (e.g., an additional layer of inorganic fibers) not recited in the claim, that third party thermal runaway barrier is considered covered by the claim, if the additional feature/element does not determine whether the desired thermal insulation properties will be exhibited by the thermal runaway barrier.

As used herein, the term "inorganic" refers to ceramic or otherwise nonmetallic (i.e., not a metal, metal alloy, or metal composite) inorganic material.

A "thermal runaway" is when a battery cell experiences an exothermic chain reaction causing the phenomenon of an uncontrollable temperature rise of the battery cell. The exothermic chain reaction may be caused, for example, by over-heating of the battery cell, over-voltage of the battery cell, and mechanical puncture of the battery cell, among other reasons.

A "thermal propagation" is when a battery cell thermal runaway causes the remaining battery cells in a battery pack or system to undergo the thermal runaway phenomenon.

A "thermal runaway event" refers to the overheating of one battery cell, in a container of battery cells, causing a chain reaction of adjacent battery cells overheating, and potentially exploding or catching fire, until the number of overheated battery cells reaches a critical point of propagation resulting in all or more than half of the battery cells in the module or assembly of modules being destroyed. Factors that can cause a battery cell to overheat include: physical damage, applying over voltage, overheating (internal battery cell shorting).

As the energy density of a battery cell increases, the temperature at which the battery cell starts to malfunction (e.g., from at least losing its efficiency or failing to function up to igniting, burning or exploding) decreases. Likewise, as the energy density of the battery cell decreases, the temperature at which the battery cell starts to malfunction increases. For example, with a controlled ramping up of the temperature, NMC811 type battery cells tend to start malfunctioning or even blow up when the temperature reaches around 120° C. to 130° C., while NMC622 type battery cells start to malfunction or even blow up when they reach a temperature of around 180° C. The corresponding temperature is higher for battery cells with lower energy densities (e.g., NMC532 and NMC433 type battery cells). With physically larger battery cells or when the temperature is rapidly increased, thermal diffusion through the battery cell can result in the localized temperature taking longer to get up to the critical point. It is believed that this thermal diffusion effect can cause the actual temperature at which the battery cell starts to malfunction or blow up to be somewhat higher. It can be desirable for the thermal runaway barrier of the present invention to prevent an adjacent battery from reaching a temperature in the range of from about 130° C. up to about 150° C.

As used herein, "preventing" a thermal runaway event refers to preventing the overheating of a single battery cell from causing the overheating of battery cells that are adjacent to the single battery cell. The barrier is considered to prevent a thermal runaway event, when adjacent battery cells do not reach above 130° C., 135° C., 140° C., 145° C. or 150° C.

As used herein, "stopping" a thermal runaway event refers to the overheating of a battery cell only causing adjacent battery cells (i.e., three, two or even only one battery cell away on either side of the overheating battery cell) to overheat and the remaining battery cells in the battery module or assembly do not overheat.

As used herein, "slowing down" a thermal runaway event refers to the thermal runaway event being slowed down at least long enough to allow personnel adjacent to the battery module or assembly (e.g., an occupant inside of an electric vehicle passenger compartment) to escape to a safe distance away from the battery module or assembly, before being injured by the thermal runaway event. Once a battery cell malfunctions (e.g., is on fire or overheats to the point of not functioning) and a thermal barrier is in place between battery cells, the time for any adjacent battery cells to propagate the malfunction (e.g., catching fire or overheating) is at least more than 5 minutes, and preferably more than 10 minutes or even 20 minutes.

The inorganic particles can be solid, hollow or contain multiple voids. Such particles can include, e.g., particles of unexpanded intumescent material, irreversibly or permanently expanded expandable materials (e.g., intumescent material), diatomaceous earth, inorganic aerogel material, porous ceramic (e.g., silica) material, irreversibly or permanently expanded perlite mineral, hollow ceramic or otherwise inorganic (e.g., glass) microspheres, etc. Such inorganic particles that contain voids such as, e.g., those found in irreversibly or permanently expanded vermiculite are particularly desirable. Particles of irreversibly or permanently expanded perlite mineral also contain voids, but perlite mineral is harder and less compressible than vermiculite mineral. Silica-based and other aerogel particles also contain voids.

As used herein, an irreversibly or permanently expanded expandable particle (e.g., particle of intumescent material such as vermiculite and perlite mineral) refers to a particle that has been heated to a temperature and for a time that causes the particle to irreversibly or permanently expand to at least 10% and up to 100% of its expandability, either by being pre-expanded before being used to form the thermal runaway barrier, or post-expanded after it is incorporated into the single layer of nonwoven fibrous thermal insulation.

Intumescent particles (e.g., vermiculite particles) can be permanently expanded by overheating the particles to beyond the point of reversibility (e.g., in the range of from about 350° C. up to about 1000° C. for vermiculite). Such a permanently expanded intumescent particle (e.g., vermiculite particle) can have an expanded accordion or worm-like structure that is easier to break apart into smaller particles, compared to the same particle in its unexpanded state, because of its elongated geometry, lower density and lower mechanical stability. As the heating temperature increases, the degree of permanent expansion of the particle increases (i.e., the particles can get larger and/or longer). It may also be desirable to use vermiculite that has been permanently expanded by a chemical treatment method (see, e.g., "Chemical Exfoliation of Vermiculite and the Production of Colloidal Dispersions", G. F. Walker, W. G. Garrett, Science 21 Apr. 1967: Vol. 156, Issue 3773, pp. 385-387, DOI: 10.1126/science. 156.3773.385; and https://science.sciencemag.org/content/156/3773/385.abstract).

Because they are easier to break apart in their expanded state, it can be desirable to post-expand the intumescent particles, after the unexpanded intumescent particles have been incorporated into the nonwoven fibrous thermal insulation. Even if gentle processing is employed so as not to substantially break them apart, it is believed that incorporating pre-expanded intumescent particles into the nonwoven fibrous thermal insulation can still result in the expanded particles becoming oriented into the plane (i.e., x-axis, y-axis, and/or therebetween) of the insulation. For example, with pre-expanded vermiculite particles, the elongated particles can become generally aligned with the fibers in the longitudinal or downstream direction (i.e., y-axis), rather than in the thickness direction (i.e., z-axis), of the nonwoven fibrous thermal insulation.

In contrast, when they are post-expanded (i.e., after the nonwoven fibrous thermal insulation is made with unexpanded intumescent particles), the expanded intumescent particles are not oriented primarily in the plane of the insulation. Unexpanded intumescent particles typically have a more uniform structural geometry (i.e., have an aspect ratio closer to 1) compared to the same particles in its expanded state. It is believed that this more uniform structural geometry is less likely to be influenced by the alignment of the fibers during the formation of the nonwoven fibrous thermal insulation. As a result, the post-expanded intumescent particles are more likely to be oriented isotropically within the nonwoven fibrous thermal insulation. For example, with post-expanded vermiculite particles, the elongated particles can become aligned in the thickness direction (i.e., z-axis), in plane (i.e., x-axis, y-axis, and/or therebetween), or off-axis thereof. It is believed this difference between the orientation of pre-expanded particles versus post-expanded particles is caused by the unexpanded particles having a more uniform structural geometry than that exhibited while in their expanded state.

2. The thermal runaway barrier according to embodiment 1, wherein the layer of nonwoven fibrous thermal insulation contains an amount of inorganic fibers in the range of from as low as about 15 to 19% up to as high as about 70, 75, 80, 85 or 90%, by weight of the layer of nonwoven fibrous thermal insulation.

3. The thermal runaway barrier according to embodiment 1 or 2, wherein the layer of nonwoven fibrous thermal insulation contains an amount of fiber shot in the range of from about 3% up to about 60% by weight of the amount of inorganic fibers in the layer of nonwoven fibrous thermal insulation.

In one embodiment, if no insulative particles are added, then inorganic fiber content is 95.2% by weight in dry-laid and 95.5% by weight in wet-laid. At the lowest level of insulative particle (e.g., aerogel particle) loading, the inorganic fiber content is 72% by weight for dry-laid and wet-laid. For dry laid nonwoven fibrous thermal insulation, the fibers are opened (i.e., the bulk fibers are separated, made less dense), which may remove some shot. For wet laid nonwoven fibrous thermal insulation, the fibers are wet cleaned, which removes more shot than is removed by the dry laid opening process. There is about 40% shot in uncleaned SuperWool Plus from Morgan, actual fibrous material content is 19-43% in the nonwoven fibrous thermal insulation. It can be desirable for the nonwoven fibrous thermal insulation to have a fiber content in the range of from about 10% up to about 80%. The lower amount of fiber would require a higher amount of organic binder. Other additives (e.g., flame retardant materials, endothermic materials, infra-red reflective materials, etc.) may be included.

4. The thermal runaway barrier according to any one of embodiments 1 to 3, wherein the layer of nonwoven fibrous thermal insulation contains an amount of the thermally insulative inorganic particles in the range of from as low as about 10%, 15%, 20%, 25%, 30% or 35% up to as high as about 40%, 45%, 50%, 55% or 60%, by weight of the layer of nonwoven fibrous thermal insulation. For example, a particle content as high as 60% can be achieved using a dry-laid process, and as high as 50% using a wet laid process.

5. The thermal runaway barrier according to any one of embodiments 1 to 4, wherein the layer of nonwoven fibrous thermal insulation contains an amount of organic binder in the range of from as low as about 2.5%, 3.0%, 3.5%, 4.0%, 4.5%, 5.0%, 5.5%, 6.0% or 6.5% up to as high as about 7.0%, 7.5%, 8.0%, 8.5%, 9.0%, 9.5%, or 10.0%, by weight of the layer of nonwoven fibrous thermal insulation.

6. The thermal runaway barrier according to any one of embodiments 1 to 5, wherein the layer of nonwoven fibrous thermal insulation has an installed (i.e., compressed) thickness in the range of from about 0.5 mm up to less than 5.0 mm. In particular, the installed (i.e., compressed) thickness can be in the range of from about 0.5 mm up to about 2.5 mm, where the lower limit can be about 0.5 mm, 0.6 mm, 0.7 mm, 0.8 mm, 0.9 mm, 1.0 mm, 1.1 mm, 1.2 mm, 1.3 mm, 1.4 mm, 1.5 mm, and the upper limit can be about 1.6 mm, 1.7 mm, 1.8 mm, 1.9 mm, 2.0 mm, 2.1 mm, 2.2 mm, 2.3 mm, 2.4 mm or 2.5 mm. In some applications, the installed thickness may even be as high as about 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm or less than 5.0 mm. The installed thickness of the layer of nonwoven fibrous thermal insulation is almost always less than its uninstalled (i.e., uncompressed) thickness. The performance of the thermal runaway barrier is measured when it is in its installed (i.e., compressed) condition.

7. The thermal runaway barrier according to any one of embodiments 1 to 6, wherein the layer of nonwoven fibrous thermal insulation has an uninstalled (i.e., uncompressed) thickness in the range of from about 1.0 mm up to 8.0 mm, where the lower limit can be about 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, or 3.5 mm, and the upper limit can be about 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.5 mm, 6.0 mm, 6.5 mm, 7.0 mm, 7.5 mm, or 8.0 mm. The uncompressed thickness of the layer of nonwoven fibrous thermal insulation is almost always greater than its installed thickness.

8. The thermal runaway barrier according to any one of embodiments 1 to 7, wherein the layer of nonwoven fibrous thermal insulation has a basis weight in the range of from as low as about 250 g/m$^2$ up to as high as about 1000 g/m$^2$. Depending on the composition of the thermal runaway barrier, it can be desirable for the basis weight to be in the range of from about 250 g/m$^2$ to about 400 g/m$^2$ (e.g., 300 g/m$^2$, 350 g/m$^2$) for a gap between adjacent battery cells in the range of from about 0.75 mm up to about 1.25 mm. Depending on the composition of the thermal runaway barrier, it can also be desirable for the basis weight to be in the range of from about 300 g/m$^2$ up to about 550 g/m$^2$ for a gap between adjacent battery cells in the range of from about 0.75 mm to about 2.5 mm., and up to as high as about, For gaps between adjacent battery cells in the range of from about 2.5 mm up to less than 5.0 mm, it can be desirable for the basis weight to be in the range of from about 600 g/m$^2$ up to about 1000 g/m$^2$ (e.g., about 650 g/m$^2$, 700 g/m$^2$, 750 g/m$^2$, 800 g/m$^2$, 850 g/m$^2$, 900 g/m$^2$, 950 g/m$^2$ or 1000 g/m$^2$). Desirable results have been achieved with thermal runaway barriers using thermally insulative inorganic particles of irreversibly or permanently expanded vermiculite, where the nonwoven fibrous thermal insulation has a basis weight of about 450 g/m$^2$ or 550 g/m$^2$ for a gap in the range of from about a 1.50 mm up to about 2.5 mm.

In one embodiment, the thermally insulative inorganic particles are particles of irreversibly or permanently expanded vermiculite, and the layer of nonwoven fibrous thermal insulation has a basis weight of 450 g/m$^2$ for an installed gap between adjacent battery cells in the range of from about a 1.50 mm up to about 2.5 mm. In another embodiment, the thermally insulative inorganic particles are particles of irreversibly or permanently expanded vermiculite, and the layer of nonwoven fibrous thermal insulation has a basis weight of 550 g/m$^2$ for an installed gap between adjacent battery cells in the range of from about a 1.50 mm up to about 2.5 mm.

9. The thermal runaway barrier according to any one of embodiments 1 to 8, wherein the layer of nonwoven fibrous thermal insulation has a basis weight in the range of from about 250 g/m$^2$ up to about 400 g/m$^2$.

In a particular embodiment, for example, a basis weight in the range of from about 300 g/m$^2$ up to 400 g/m$^2$ can be desirable, when the thermally insulative inorganic particles are vermiculite and the gap is about 1 mm. A basis weight of about 250 g/m$^2$ can also be desirable, when aerogel particles are used and the gap is about 1 mm. When the gap is about 2.0 mm, a basis weight in the range of from about 800 g/m$^2$ up to about 1000 g/m$^2$ may be desirable.

10. The thermal runaway barrier according to any one of embodiments 1 to 9, wherein the thermally insulative inorganic particles are made from or at least comprise particles of one or any combination of the materials selected from the group consisting of inorganic (e.g., titania, zirconia, and/or silica) aerogel, xerogel, hollow or porous ceramic (e.g., glass, alumina, etc.) microspheres (e.g., bubbles, foamed spheres, beads, etc.), unexpanded vermiculite, irreversibly or permanently expanded vermiculite (i.e., vermiculite that has been heated to a temperature and for a time that causes the vermiculite particles to irreversibly or permanently expand to at least 10% and up to 100% of its expandability, either by being pre-expanded before being used to form the barrier, or post-expanded after it is in the single layer of nonwoven fibrous thermal insulation), fumed silica and otherwise porous silica, irreversibly or permanently expanded perlite (i.e., perlite that has been heated to a temperature and for a time that causes the perlite particles to irreversibly or permanently expand to at least 10% and up to 100% of its expandability, either by being pre-expanded before being used to form the barrier, or post-expanded after it is in the single layer of nonwoven fibrous thermal insulation), unexpanded perlite, pumicite, irreversibly or permanently expanded clay, diatomaceous earth, titania, and zirconia.

Expanded clay is a lightweight particle or aggregate, which can be made by heating clay to around 1,200° C. (2,190° F.) in a rotary kiln. The yielding gases expand the clay by thousands of small bubbles forming during heating producing a honeycomb structure. Expanded clay can have an approximately round or potato shape due to circular movement in the kiln and is available in different sizes and densities. Expanded clays have been used to make lightweight concrete products (see, e.g., the website: https://www.archiexpo.com/architecture-design-manufacturer/expanded-clay-aggregate-concrete-23000.html) and other uses. Expanded clay is most commonly known under the brand names LECA (acronym of light expanded clay aggregate) or LIAPOR (porous has clay), also known as Hydroton and under the non-proprietary terms fired clay pebble, grow rocks, expanded clay or hydrocorns, are small globes of burnt and expanded clay (see, e.g., the website: https://www.sciencedirect.com/topics/engineering/expanded-clay-aggregate).

11. The thermal runaway barrier according to any one of embodiments 1 to 10, wherein the inorganic fibers of the fiber matrix are selected from the group of fibers consisting of alkaline earth silicate fibers, refractory ceramic fibers (RCF), polycrystalline wool (PCW) fibers, basalt fibers, glass fibers and silicate fiber. Glass fibers and silica fibers typically do not contain any or only nominal shot particles. PCW typically contains a max of 5% shot particles, while alkaline earth silicate (AES) fibers contain up to 60% shot particles when uncleaned and as low as about 10-30% minimum shot particles when cleaned).

12. The thermal runaway barrier according to any one of embodiments 1 to 11, wherein the organic binders are in the form of polymer fibers (e.g., PE/PET, PET, FRPET), dry polymer powder (e.g., LDPE, polyamide, epoxy resin powder (3M SCOTCHCAST 265, 3M SCOTCHKOTE 6258)) or a liquid binder (e.g., acrylic latex, ethylene vinyl acetate (EAF68) latex, silicone, polyurethane etc.).

13. The thermal runaway barrier according to any one of embodiments 1 to 12, wherein the layer of nonwoven fibrous thermal insulation is encapsulated by the organic encapsulation layer.

14. The thermal runaway barrier according to embodiment 13, wherein the organic encapsulation layer has at least one vent hole formed therethrough that is located and sized to allow expanding gas (e.g., air) contained within the thermal runaway barrier to escape from the organic encapsulation, such that the structural integrity of the organic encapsulation layer is kept intact (i.e., the layer of nonwoven fibrous thermal insulation remains completely, mostly or at least significantly encapsulated by the organic encapsulation layer), when the thermal runaway barrier is compressed during the assembly of the battery cell module (e.g., a stack of battery cells) or when the thermal runaway barrier heats up (e.g., during the normal operation or overheating of the adjacent battery cells). Each vent hole can be in the shape of a rectangle (e.g., see FIG. 8), circle, oval or any other shape desired or combination thereof. One or more or each vent hole can be in the form of a notch that projects from a side edge of the encapsulation towards the center of the thermal runaway barrier (e.g., see the left side vent hole 54 in FIG. 8 and the vent holes 54 in FIG. 7). Alternatively, one or more or each vent hole can be formed interior of the side edge of the encapsulation and adjacent to the nonwoven thermal insulation (see the right side vent hole 52 in FIG. 8 and the vent holes 52 in FIG. 6). In addition, one or more or each vent hole can be formed through the encapsulation layer on only one side (see vent hole 52 on the right side of FIG. 6) or both sides (see vent hole 52 on the left side of FIG. 6) of the nonwoven fibrous thermal insulation. It can also be desirable for each vent hole to be in the form of a plurality of small perforation, that are clustered together (e.g., like a screen, sieve or colander) to provide the desired exit opening area.

15. The thermal runaway barrier according to embodiment 13 or 14, wherein the thermal runaway barrier has a top edge, a bottom edge and opposite side edges, and the at least one vent hole is located along the periphery of one or both opposite side edges.

16. The thermal runaway barrier according to any one of embodiments 13 to 15, wherein the at least one vent hole provides an exit opening through the organic encapsulation layer having an opening area in the range of from about 2 mm$^2$ up to about 15 mm$^2$. It is contemplated that any particular area within this range, or any narrower range within this range, could be desirable.

17. The thermal runaway barrier according to any one of embodiments 13 to 16, wherein the organic encapsulation layer is in the form of a continuous layer, a discontinuous layer (e.g., having perforations, through-holes, or porosity that would allow a gas to penetrate through the organic layer), or a combination of both. In addition, the organic layer can be in the form of an organic (e.g., polymeric) film, scrim, woven or nonwoven fabric, adhesive (e.g., a thermoplastic or hot-melt adhesive) layer or a combination thereof. One example of the organic layer is a polymeric film (e.g., a co-polyester polymeric film).

18. The thermal runaway barrier according to any one of embodiments 13 to 17, wherein the organic encapsulation layer is a calendared layer, hot-melt coated layer, spray coated layer, dip coated layer, or laminated layer (e.g., with by use of a pressure sensitive adhesive or other adhesive).

19. The thermal runaway barrier according to any one of embodiments 13 to 18, wherein the layer of nonwoven fibrous thermal insulation has a peripheral edge, and the organic encapsulation layer is sealed around the peripheral edge.

20. The thermal runaway barrier according to any one of embodiments 1 to 19, wherein the layer of nonwoven fibrous thermal insulation passes at least the V-2 or V-1 level, and preferably the V-0 level, of the below UL94 Flammability Test.

Flammability Test

The test was performed using the UL-94 standard, the Standard for safety of Flammability of Plastic Materials for Parts in Devices and Appliances testing. The UL-94 standard is a plastics flammability standard released by Underwriters Laboratories of the United States. The standard determines the material's tendency to either extinguish or spread the flame once the specimen has been ignited. The UL-94 standard is harmonized with IEC 60707, 60695-11-10 and 60695-11-20 and ISO 9772 and 9773. A 75 mm×150 mm sample was exposed to a 2 cm, 50 W tirrel burner flame ignition source. The test samples were placed vertically above the flame with the test flame impinging on the bottom of the sample. For each sample, the time to extinguish was measured and V ratings are assigned. V ratings are a measure to extinguish along with the sample not burning to the top clamp or dripping molten material which would ignite a cotton indicator, as shown in Table 1 below.

TABLE 1

| UL94 classification (V rating). | | | |
|---|---|---|---|
| UL 94 classification | V-0 | V-1 | V-2 |
| Burning stops within | 10 s | 30 s | 30 s |
| Drips of burning material allowed (ignites cotton ball) | No | No | Yes |
| Total burn of sample | No | No | No |

21. The thermal runaway barrier according to any one of embodiments 1 to 20, wherein the thermally insulative inorganic particles are made from or at least comprise particles of irreversibly or permanently expanded expandable materials (e.g., intumescent material).

22. The thermal runaway barrier according to embodiment 21, wherein the thermally insulative inorganic particles are made from or at least comprise particles of expanded intumescent material that has been irreversibly or permanently expanded in the range of from at least about 10%, 20%, 30%, 40%, 50%, 60%, 70%, 80% or 90% up to 100% of its expandability.

23. The thermal runaway barrier according to any one of embodiments 1 to 20, wherein the thermally insulative inorganic particles are made from or at least comprise particles that are irreversibly or permanently expanded (e.g., vermiculite particles).

24. The thermal runaway barrier according to embodiment 23, wherein the expanded particles (e.g., vermiculite particles) have been irreversibly or permanently expanded in the range of from at least about 10%, 20%, 30%, 40%, 50%, 60%, 70%, 80% or 90% up to 100% of its expandability.

25. The thermal runaway barrier according to any one of embodiments 1 to 24, wherein the thermally insulative inorganic particles at least further comprise particles of fumed silica.

26. The thermal runaway barrier according to embodiment 25, wherein the particles of fumed silica have a surface area in the range of from about 100 $m^2/g$ up to about 400 $m^2/g$.

27. A thermal runaway barrier assembly comprising a plurality of the thermal runaway barriers according to any one of embodiments 1 to 26, wherein the plurality of thermal runaway barriers are provided (a) in a container (e.g., a cardboard or other box) in the form of a stack, (b) disposed end-to-end in series, with one major face of each thermal runaway barrier being adhered onto a major adhesive surface of a length of double-sided or single-sided adhesive tape (When a double-sided adhesive tape is used, the opposite major adhesive surface of the tape can be protected by a release liner), or (c) disposed end-to-end in series in the form of a tape, with the single layer of nonwoven fibrous thermal insulation of each thermal runaway barrier being disposed end-to-end and sandwiched or otherwise encapsulated between two opposing lengths of organic (e.g., polymeric) encapsulation layers (e.g., in the form of two opposing films, coatings, etc.).

Battery Cell Module Embodiments

28. A battery cell module or assembly for an electric vehicle, the battery cell module or assembly comprising:
    a plurality of battery cells disposed in a housing; and
    a plurality of thermal runaway barriers according to any one of embodiments 1 to 27,
    wherein the battery cells are lined up in a row or stack, with one thermal runaway barrier being disposed between each pair of adjacent battery cells or between a predetermined number of battery cells.

Method of Making Battery Cell Thermal Runaway Barrier Embodiments

29. A method of making the thermal runaway barrier according to any one of embodiments 1 to 27, wherein the method comprises forming the layer of nonwoven fibrous thermal insulation using a wet-laid process or dry-laid process.

30. The method according to embodiment 29, further comprising:
    providing thermally insulative inorganic particles that are made completely of, mostly of or at least comprise unexpanded intumescent particles (e.g., unexpanded vermiculite particles or unexpanded perlite particles);
    disposing the thermally insulative inorganic particles so as to be evenly or uniformly distributed throughout or within the layer of nonwoven fibrous thermal insulation; and heating the unexpanded intumescent particles to a temperature and for a time that causes the unexpanded intumescent particles to irreversibly or permanently expand, wherein the heating occurs before or after the thermally insulative inorganic particles are disposed within the layer of nonwoven fibrous thermal insulation.

31. The method according to embodiment 30, wherein the heating occurs after the thermally insulative inorganic particles are disposed within the layer of nonwoven fibrous thermal insulation.

32. The method according to embodiment 30 or 31, wherein the heating causes the unexpanded intumescent particles to irreversibly or permanently expand in the range of from at least about 10%, 20%, 30%, 40%, 50%, 60%, 70%, 80% or 90% up to 100% of their expandability.

33. The method according to any one of embodiments 30 to 32, wherein the unexpanded intumescent particles include unexpanded vermiculite particles, unexpanded perlite particles, or both.

34. The method according to embodiment 29, further comprising:

providing thermally insulative inorganic particles that are made completely of, mostly of, or at least comprise pre-expanded intumescent particles (e.g., expanded vermiculite or expanded perlite); and disposing the thermally insulative inorganic particles so as to be evenly or uniformly distributed throughout or within the layer of nonwoven fibrous thermal insulation, wherein the pre-expanded intumescent particles where formed by heating unexpanded intumescent particles to a temperature and for a time that causes the unexpanded intumescent particles to irreversibly or permanently expand, before the thermally insulative inorganic particles are disposed within the layer of nonwoven fibrous thermal insulation.

35. The method according to embodiment 34, wherein the pre-expanded intumescent particles are irreversibly or permanently expanded in the range of from at least about 10%, 20%, 30%, 40%, 50%, 60%, 70%, 80% or 90% up to 100% of their expandability.

36. The method according to embodiment 34 or 35, wherein the pre-expanded intumescent particles include pre-expanded vermiculite particles, pre-expanded perlite particles, or both.

This invention may take on various modifications and alterations without departing from its spirit and scope. For example, it is believed that microwave heating can be used to irreversibly or permanently expand the particles made from intumescent materials. It is also believed that using microwave energy, rather than baking in an oven, can result in a more uniform expansion of the intumescent particles within the fiber matrix. Accordingly, this invention is not limited to the above-described but is to be controlled by the limitations set forth in the following embodiments and any equivalents thereof. This invention may be suitably practiced in the absence of any element not specifically disclosed herein. All patents and patent applications cited above, including those in the Background section, are incorporated by reference into this document in total.

What is claimed is:

1. A thermal runaway barrier operatively adapted for being disposed between battery cells of a battery assembly and for at least significantly slowing down a thermal runaway event within the battery assembly, said thermal runaway barrier consisting essentially of:

a single-layer of a nonwoven fibrous thermal insulation comprising a fiber matrix of inorganic fibers, thermally insulative inorganic particles dispersed within the fiber matrix, and a binder dispersed within the fiber matrix so as to hold together the fiber matrix; and an organic encapsulation layer encapsulating the single-layer of nonwoven fibrous thermal insulation.

2. The thermal runaway barrier according to claim 1, wherein the layer of nonwoven fibrous thermal insulation contains an amount of fiber shot in the range of from about 3% up to about 60% by weight of the amount of inorganic fibers in the layer of nonwoven fibrous thermal insulation.

3. The thermal runaway barrier according to claim 1, wherein the layer of nonwoven fibrous thermal insulation contains an amount of thermally insulative inorganic particles in the range of from as low as about 10% up to as high as about 60%, by weight of the layer of nonwoven fibrous thermal insulation.

4. The thermal runaway barrier according to claim 1, wherein the layer of nonwoven fibrous thermal insulation contains an amount of organic binder in the range of from as low as about 2.5% up to as high as about 10.0%, by weight of the layer of nonwoven fibrous thermal insulation.

5. The thermal runaway barrier according to claim 1, wherein the layer of nonwoven fibrous thermal insulation has an installed thickness in the range of from about 0.5 mm up to less than 5.0 mm.

6. The thermal runaway barrier according to claim 1 wherein the layer of nonwoven fibrous thermal insulation has a basis weight in the range of from as low as about 250 $g/m^2$ and up to as high as about 1000 $g/m^2$.

7. The thermal runaway barrier according to a claim 1 wherein the layer of nonwoven fibrous thermal insulation has an uncompressed basis weight in the range of from about 250 $g/m^2$ up to about 400 $g/m^2$.

8. The thermal runaway barrier according to claim 1, wherein the thermally insulative inorganic particles comprise particles of one or any combination of the materials selected from the group consisting of inorganic aerogel, xerogel, hollow or porous ceramic microspheres, unexpanded vermiculite, irreversibly or permanently expanded vermiculite, fumed silica, otherwise porous silica, irreversibly or permanently expanded or unexpanded perlite, pumicite, irreversibly or permanently expanded clay, diatomaceous earth, titania and zirconia.

9. The thermal runaway barrier according to claim 1, wherein the organic encapsulation layer has at least one vent hole formed therethrough that is located and sized to allow gas contained within the thermal runaway barrier to escape from the organic encapsulation, such that the structural integrity of the organic encapsulation layer is kept intact, during a thermal runaway event.

10. The thermal runaway barrier according to claim 1, wherein the thermal runaway barrier has a top edge, a bottom edge and opposite side edges, and the at least one vent hole is located along the periphery of one or both opposite side edges.

11. The thermal runaway barrier according to claim 1, wherein the at least one vent hole provides an exit opening through the organic encapsulation layer having an opening area in the range of from about 2 $mm^2$ up to about 15 $mm^2$.

12. The thermal runaway barrier according to claim 1, wherein the layer of nonwoven fibrous thermal insulation has a peripheral edge, and the organic encapsulation layer is sealed around the peripheral edge.

13. The thermal runaway barrier according to claim 1, wherein the layer of nonwoven fibrous thermal insulation passes at least the V-2 level of the UL94 Flammability Test.

14. A battery cell module for an electric vehicle, said battery cell module comprising:

a plurality of battery cells disposed in a housing; and a plurality of thermal runaway barriers according to claim 1, wherein the battery cells are lined up in a row, with one thermal runaway barrier being disposed between each pair of adjacent battery cells.

* * * * *